US012230283B2

(12) United States Patent
Shlomot et al.

(10) Patent No.: US 12,230,283 B2
(45) Date of Patent: *Feb. 18, 2025

(54) STEREO SIGNAL PROCESSING METHOD AND APPARATUS

(71) Applicant: Huawei Technologies Co., Ltd., Shenzhen (CN)

(72) Inventors: Eyal Shlomot, Long Beach, CA (US); Haiting Li, Beijing (CN); Lei Miao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,281

(22) Filed: Aug. 14, 2023

(65) Prior Publication Data

US 2023/0395083 A1 Dec. 7, 2023

Related U.S. Application Data

(63) Continuation of application No. 17/512,202, filed on Oct. 27, 2021, now Pat. No. 11,763,825, which is a (Continued)

(30) Foreign Application Priority Data

May 16, 2017 (CN) ......................... 201710344704.4

(51) Int. Cl.
*G10L 19/008* (2013.01)
*H04S 1/00* (2006.01)

(52) U.S. Cl.
CPC ............ *G10L 19/008* (2013.01); *H04S 1/007* (2013.01); *H04S 2420/03* (2013.01)

(58) Field of Classification Search
CPC . G10L 2021/02165; G10L 2021/02166; G10L 21/0272; G10L 21/0308;
(Continued)

(56) References Cited

U.S. PATENT DOCUMENTS 7,949,140 B2 * 5/2011 Kino ....................... H04S 7/301
381/59
8,577,045 B2 11/2013 Gibbs
(Continued)

FOREIGN PATENT DOCUMENTS

CN 1937854 A 3/2007
CN 101427307 A 5/2009
(Continued)

OTHER PUBLICATIONS

Fatus, B., "Master Thesis : Parametric Coding for Spatial Audio," KTH, Stockholm, Sweden. Jul.-Dec. 2015, 70 pages.
(Continued)

*Primary Examiner* — Leshui Zhang
(74) *Attorney, Agent, or Firm* — Conley Rose, P.C.

(57) ABSTRACT

A stereo signal processing method includes performing delay estimation on a stereo signal of a current frame to determine an inter-channel time difference of the current frame, identifying a sign of the inter-channel time difference of the current frame is different from a sign of an inter-channel time difference of a previous frame of the current frame, performing delay alignment processing on the first-channel signal of the current frame based on the inter-channel time difference of the current frame, and performing delay alignment processing on the second-channel signal of the current frame based on the inter-channel time difference of the previous frame.

20 Claims, 10 Drawing Sheets

Related U.S. Application Data continuation of application No. 16/682,484, filed on Nov. 13, 2019, now Pat. No. 11,200,907, which is a continuation of application No. PCT/CN2017/116204, filed on Dec. 14, 2017.

(58) Field of Classification Search

CPC ............... G10L 21/034; G10L 21/0364; G10L 21/0575; H04B 2001/3872; H04R 1/22; H04R 1/222; H04R 1/24; H04R 1/26

USPC ...... 704/500, 501, 502, 503, 504; 381/1–23, 381/26, 91, 92, 112, 113, 114, 115, 122; 700/94

See application file for complete search history.

(56) References Cited

U.S. PATENT DOCUMENTS

| | | | |
|---|---|---|---|
| 9,373,320 B1 | 6/2016 | Lyon et al. | |
| 2004/0039464 A1* | 2/2004 | Virolainen | G10L 19/005 |
| 2005/0169488 A1 | 8/2005 | Kato et al. | |
| 2006/0147048 A1 | 7/2006 | Breebaart et al. | |
| 2007/0127729 A1 | 6/2007 | Breebaart et al. | |
| 2009/0313028 A1* | 12/2009 | Tammi | G10L 19/265 704/500 |
| 2010/0054482 A1 | 3/2010 | Johnston | |
| 2010/0241436 A1 | 9/2010 | Kim et al. | |
| 2010/0280822 A1 | 11/2010 | Yoshida | |
| 2010/0290629 A1 | 11/2010 | Morii | |
| 2011/0206223 A1* | 8/2011 | Ojala | G10L 19/008 381/300 |
| 2011/0288872 A1* | 11/2011 | Liu | G10L 19/008 704/500 |
| 2011/0301962 A1 | 12/2011 | Wu et al. | |
| 2012/0033817 A1* | 2/2012 | Francois | G10L 19/24 381/2 |
| 2012/0142302 A1* | 6/2012 | Wu | H03H 17/0664 455/313 |
| 2012/0232912 A1* | 9/2012 | Tammi | G10L 19/022 704/502 |
| 2013/0282384 A1* | 10/2013 | Gibbs | G10L 19/008 704/500 |
| 2013/0304481 A1* | 11/2013 | Briand | G10L 19/008 704/500 |
| 2014/0219486 A1* | 8/2014 | Brown | H04R 25/505 381/320 |
| 2015/0010155 A1* | 1/2015 | Virette | G10L 19/008 381/23 |
| 2015/0049872 A1* | 2/2015 | Virette | G10L 19/008 381/23 |
| 2016/0254002 A1 | 9/2016 | Zhang et al. | |
| 2016/0323687 A1 | 11/2016 | Wu et al. | |
| 2017/0085363 A1 | 3/2017 | Mncelette | |
| 2017/0148447 A1* | 5/2017 | Atti | G10L 25/51 |
| 2017/0372710 A1 | 12/2017 | Zhang et al. | |
| 2019/0172474 A1* | 6/2019 | Liu | G10L 19/008 |
| 2020/0082834 A1 | 3/2020 | Shlomot et al. | |

FOREIGN PATENT DOCUMENTS

| | | | |
|---|---|---|---|
| CN | 101673545 | A | 3/2010 |
| CN | 101695150 | A | 4/2010 |
| CN | 102089809 | A | 6/2011 |
| CN | 102157150 | A | 8/2011 |
| CN | 102292767 | A | 12/2011 |
| CN | 102292769 | A | 12/2011 |
| CN | 102307323 | A | 1/2012 |
| CN | 102428513 | A | 4/2012 |
| CN | 104681029 | A | 6/2015 |
| CN | 105405445 | A | 3/2016 |
| CN | 105682000 | A | 6/2016 |
| CN | 106033671 | A | 10/2016 |
| CN | 106210368 | A | 12/2016 |
| CN | 107731238 | A | 2/2018 |
| CN | 108877815 | B | 2/2021 |
| EP | 1107232 | A2 | 6/2001 |
| EP | 1553804 | A3 | 12/2006 |
| EP | 2476113 | A1 | 7/2012 |
| EP | 2899997 | A1 | 7/2015 |
| EP | 2947654 | A1 | 11/2015 |
| JP | 2001209399 | A | 8/2001 |
| JP | 2010541007 | A | 12/2010 |
| KR | 20050095896 | A | 10/2005 |
| KR | 20160077201 | A | 7/2016 |
| KR | 102281614 | B1 | 7/2021 |
| WO | 2010084756 | A1 | 7/2010 |
| WO | 2011029984 | A1 | 3/2011 |
| WO | 2014112793 | A1 | 7/2014 |
| WO | 2014161990 | A1 | 10/2014 |
| WO | 2017087073 | A1 | 5/2017 |

OTHER PUBLICATIONS

"3rd Generation Partnership Project; Technical Specification Group Services and System Aspects; Virtual Reality (VR) media services over 3GPP (Release 15)," 3GPP TR 26.918 V0.7.0, Apr. 2017, 58 pages.

Zeng Min, et al, "Design and implementation of parametric stereo encoder in MDFT domain," 2016, 7 pages.

Liang Yusu, "Multi-channel and stereo pickup technology," 2017, 5 pages (with an English abstract).

Wenhai Wu, et al, "Parametric stereo coding scheme with a new downmix method and whole band inter channel time/phase differences," ICASSP 2013—2013 IEEE International Conference on Acoustics, Speech and Signal Processing, May 2013, pp. 556-560, XP032509104.

* cited by examiner

STEREO SIGNAL PROCESSING METHOD AND APPARATUS

CROSS-REFERENCE TO RELATED APPLICATIONS

This is a continuation of U.S. patent application Ser. No. 17/512,202 filed on Oct. 27, 2021, which is a continuation of U.S. patent application Ser. No. 16/682,484 filed on Nov. 13, 2019, now U.S. Pat. No. 11,200,907, which is a continuation of International Patent Application No. PCT/CN2017/116204 filed on Dec. 14, 2017, which claims priority to Chinese Patent Application No. 201710344704.4 filed on May 16, 2017. All of the aforementioned patent applications are hereby incorporated by reference in their entireties.

TECHNICAL FIELD

This application relates to the field of information technologies, and in particular, to a stereo signal processing method and apparatus.

BACKGROUND

As living quality is improving, people have increasing demands on high-quality audio. Compared with mono audio, stereo audio provides a sense of orientation and a sense of distribution for each sound source, and provides improved clarity, intelligibility, and on-site feeling of information. Therefore, stereo audio is very popular. In an existing time-domain stereo encoding technology, usually a left-channel signal and a right-channel signal are downmixed in time domain into a mid-channel signal and a side-channel signal. The downmixed mid-channel signal may be denoted as 0.5×(L+R), which represents related information between the left-channel signal and the right-channel signal. The downmixed side-channel signal may be denoted as 0.5×(L−R), which represents difference information between the left-channel signal and the right-channel signal. L indicates the left-channel signal, and R indicates the right-channel signal. Then, the mid-channel signal and the side-channel signal are separately encoded using a mono-channel encoding method. The mid-channel signal is usually encoded using a relatively large quantity of bits, and the side-channel signal is usually encoded using a relatively small quantity of bits.

To improve encoding efficiency, the mid-channel signal needs to be larger, and the side-channel signal needs to be smaller. Currently, in time-domain stereo encoding, before the mid-channel signal and the side-channel signal are obtained, a matching algorithm is used to perform delay estimation on the left-channel signal and the right-channel signal to obtain an inter-channel time difference, and delay alignment processing is performed on the left-channel signal and the right-channel signal based on the inter-channel time difference such that the downmixed mid-channel signal is larger, and the downmixed side-channel signal is smaller. In the algorithm for performing delay alignment based on the inter-channel time difference, usually, one channel is selected from a left channel and a right channel, and delay alignment processing is performed on a signal of the channel. This channel is referred to as a target channel. Delay adjustment is not to be performed on a signal of the other channel, and the other channel is used as a reference for delay adjustment on the target channel. This channel is referred to as a reference channel.

In an existing method, if it is found that a sign of an inter-channel time difference that is of a current frame and that is obtained through delay estimation is different from a sign of an inter-channel time difference of a previous frame, selection of a target channel of the current frame is kept the same as that of a target channel of the previous frame. In addition, regardless of an estimated value of the inter-channel time difference of the current frame, the inter-channel time difference of the current frame is forcibly set to zero. Then, delay alignment processing is performed on the target channel of the current frame based on the inter-channel time difference that is set to zero, to ensure that a delay between the target channel of the current frame after delay alignment processing and a reference channel is zero.

In the foregoing method, when signs of inter-channel time differences of two frames of stereo signals change, it indicates that an arrival sequence of left- and right-channel signals changes, and the right-channel signal may arrive first instead of the left-channel signal that originally arrives first, or the left-channel signal may arrive first instead of the right-channel signal that originally arrives first. If the inter-channel time difference of the current frame is forcibly set to zero, the left and right channels are adjusted based on a time difference of zero rather than an actual time difference between the left and right channels, and time-domain downmixing processing is performed on left- and right-channel signals that are obtained in this way and that are obtained after delay adjustment. However, in fact, actual delay alignment is not implemented on the two channel signals. Therefore, there is no effective way to offset a correlation component between the two channels, and consequently, energy of a side-channel signal of the current frame after time-domain downmixing increases, reducing overall stereo encoding quality.

SUMMARY

This application provides a stereo signal processing method and apparatus to resolve a problem of low encoding quality of stereo encoding caused because inter-channel delays are not aligned when a sign of an inter-channel time difference between two frames of stereo signals changes.

An embodiment of this application provides a stereo signal processing method, applied to an encoder side of a stereo codec, where the method includes performing delay estimation on a stereo signal of a current frame to determine an inter-channel time difference of the current frame, where the inter-channel time difference of the current frame is a time difference between a first-channel signal of the current frame and a second-channel signal of the current frame, and if a sign of the inter-channel time difference of the current frame is different from a sign of an inter-channel time difference of a previous frame of the current frame, performing delay alignment processing on the first-channel signal of the current frame based on the inter-channel time difference of the current frame, and performing delay alignment processing on the second-channel signal of the current frame based on the inter-channel time difference of the previous frame, where the first-channel signal is a target-channel signal of the current frame, and the second-channel signal is on a same channel as a target-channel signal of the previous frame.

According to the method provided in this application, when the sign of the inter-channel time difference of the current frame is different from the sign of the inter-channel time difference of the previous frame of the current frame, delay alignment processing is performed on the first-channel signal of the current frame based on the inter-channel time difference of the current frame, and delay alignment processing is performed on the second-channel signal of the current frame based on the inter-channel time difference of the previous frame. Therefore, delay alignment processing of the current frame can be performed based on an actual inter-channel time difference, thereby ensuring a better alignment effect, and avoiding a problem that because the inter-channel time difference of the current frame is forcibly set to zero, a correlation component between the two channels of the current frame after delay alignment processing cannot be offset, and consequently, energy of a secondary-channel signal of the current frame after time-domain down-mixing increases, affecting overall encoding quality.

Optionally, performing delay alignment processing on the first-channel signal of the current frame based on the inter-channel time difference of the current frame includes compressing a signal of a first processing length in the first-channel signal of the current frame into a signal of a first alignment processing length to obtain the first-channel signal of the current frame after delay alignment processing, where the first processing length is determined based on the inter-channel time difference of the current frame and the first alignment processing length, and the first processing length is greater than the first alignment processing length.

Optionally, the first processing length is a sum of an absolute value of the inter-channel time difference of the current frame and the first alignment processing length.

Optionally, a start point of the signal of the first processing length is located before a start point of the signal of the first alignment processing length, and a length between the start point of the signal of the first processing length and the start point of the signal of the first alignment processing length is the absolute value of the inter-channel time difference of the current frame.

Optionally, a start point of the signal of the first alignment processing length is located at a start point of the first-channel signal of the current frame or after the start point of the first-channel signal of the current frame, and a length between the start point of the signal of the first alignment processing length and an end point of the first-channel signal of the current frame is greater than or equal to the first alignment processing length.

Optionally, a start point of the signal of the first alignment processing length is located before a start point of the first-channel signal of the current frame, a length between the start point of the signal of the first alignment processing length and the start point of the first-channel signal of the current frame is less than or equal to a transition section length, a length between the start point of the signal of the first alignment processing length and an end point of the first-channel signal of the current frame is greater than or equal to a sum of the first alignment processing length and the transition section length, and the transition section length is less than or equal to the absolute value of the inter-channel time difference of the current frame.

Optionally, performing delay alignment processing on the second-channel signal of the current frame based on the inter-channel time difference of the previous frame includes stretching a signal of a second processing length in the second-channel signal of the current frame into a signal of a second alignment processing length to obtain the second-channel signal of the current frame after delay alignment processing, where the second processing length is determined based on the inter-channel time difference of the previous frame and the second alignment processing length, and the second processing length is less than the second alignment processing length.

Optionally, the second processing length is a difference between the second alignment processing length and an absolute value of the inter-channel time difference of the previous frame.

Optionally, a start point of the signal of the second processing length is located after a start point of the signal of the second alignment processing length, and a length between the start point of the signal of the second processing length and the start point of the signal of the second alignment processing length is the absolute value of the inter-channel time difference of the previous frame.

Optionally, a start point of the signal of the second alignment processing length is located at a start point of the second-channel signal of the current frame or after the start point of the second-channel signal of the current frame, and a length between the start point of the signal of the second alignment processing length and an end point of the second-channel signal of the current frame is greater than or equal to the second alignment processing length.

Optionally, a length between the start point of the signal of the second alignment processing length and the start point of the second-channel signal of the current frame is equal to a second preset length, and a length between the start point of the signal of the first alignment processing length and the start point of the first-channel signal of the current frame is equal to a sum of the second preset length and the second alignment processing length.

Optionally, the first alignment processing length is less than or equal to a frame length of the current frame, and the first alignment processing length is either a preset length or meets the following formula:

$$L\_next\_target = \frac{|cur\_itd| \times L}{|prev\_itd| + |cur\_itd|},$$

where L_next_target is the first alignment processing length, cur_itd is the inter-channel time difference of the current frame, prev_itd is the inter-channel time difference of the previous frame, and L is a processing length of delay alignment processing.

Optionally, the second alignment processing length is less than or equal to the frame length of the current frame, and the second alignment processing length is either a preset length or meets the following formula:

$$L\_pre\_target = \frac{|prev\_itd| \times L}{|prev\_itd| + |cur\_itd|},$$

where L_pre_target is the second alignment processing length, cur_itd is the inter-channel time difference of the current frame, prev_itd is the inter-channel time difference of the previous frame, and L is the processing length of delay alignment processing.

Optionally, the processing length of delay alignment processing is less than or equal to the frame length of the current frame, and the processing length of delay alignment processing is either a preset length or meets the following formula:

$$L = \frac{(|prev\_itd| + |cur\_itd|) \times L\_init}{MAX\_DELAY\_CHANGE},$$

where L is the processing length of delay alignment processing, MAX_DELAY_CHANGE is a maximum difference value between inter-channel time differences of adjacent frames, and L_init is a preset processing length of delay alignment processing.

An embodiment of this application provides a stereo signal processing apparatus that may perform and implement any stereo signal processing method provided in the foregoing method.

In a possible design, the stereo signal processing apparatus includes a plurality of functional modules, for example, includes a processing unit and a transceiver unit configured to implement any stereo signal processing method provided in the foregoing. Therefore, when a sign of an inter-channel time difference of a current frame is different from a sign of an inter-channel time difference of a previous frame of the current frame, delay alignment processing is performed on a first-channel signal of the current frame based on the inter-channel time difference of the current frame, and delay alignment processing is performed on a second-channel signal of the current frame based on the inter-channel time difference of the previous frame. Therefore, delay alignment processing of the current frame can be performed based on an actual inter-channel time difference, thereby ensuring a better alignment effect, and avoiding a problem that because the inter-channel time difference of the current frame is forcibly set to zero, a correlation component between the two channels of the current frame after delay alignment processing cannot be offset, and consequently, energy of a secondary-channel signal of the current frame after time-domain downmixing increases, affecting overall encoding quality.

An embodiment of this application provides a stereo signal processing apparatus, where the apparatus includes a processor and a memory, the memory stores an executable instruction, and the executable instruction is used to instruct the processor to perform the following steps of performing delay estimation on a stereo signal of a current frame to determine an inter-channel time difference of the current frame, where the inter-channel time difference of the current frame is a time difference between a first-channel signal of the current frame and a second-channel signal of the current frame, and if a sign of the inter-channel time difference of the current frame is different from a sign of an inter-channel time difference of a previous frame of the current frame, performing delay alignment processing on the first-channel signal of the current frame based on the inter-channel time difference of the current frame, and performing delay alignment processing on the second-channel signal of the current frame based on the inter-channel time difference of the previous frame, where the first-channel signal is a target-channel signal of the current frame, and the second-channel signal is on a same channel as a target-channel signal of the previous frame.

Optionally, when performing delay alignment processing on the first-channel signal of the current frame based on the inter-channel time difference of the current frame, the executable instruction is used to instruct the processor to perform the following steps of compressing a signal of a first processing length in the first-channel signal of the current frame into a signal of a first alignment processing length, to obtain the first-channel signal of the current frame after delay alignment processing, where the first processing length is determined based on the inter-channel time difference of the current frame and the first alignment processing length, and the first processing length is greater than the first alignment processing length.

Optionally, the first processing length is a sum of an absolute value of the inter-channel time difference of the current frame and the first alignment processing length.

Optionally, a start point of the signal of the first processing length is located before a start point of the signal of the first alignment processing length, and a length between the start point of the signal of the first processing length and the start point of the signal of the first alignment processing length is the absolute value of the inter-channel time difference of the current frame.

Optionally, a start point of the signal of the first alignment processing length is located at a start point of the first-channel signal of the current frame or after the start point of the first-channel signal of the current frame, and a length between the start point of the signal of the first alignment processing length and an end point of the first-channel signal of the current frame is greater than or equal to the first alignment processing length.

Optionally, a start point of the signal of the first alignment processing length is located before a start point of the first-channel signal of the current frame, a length between the start point of the signal of the first alignment processing length and the start point of the first-channel signal of the current frame is less than or equal to a transition section length, a length between the start point of the signal of the first alignment processing length and an end point of the first-channel signal of the current frame is greater than or equal to a sum of the first alignment processing length and the transition section length, and the transition section length is less than or equal to the absolute value of the inter-channel time difference of the current frame.

Optionally, when performing delay alignment processing on the second-channel signal of the current frame based on the inter-channel time difference of the previous frame, the executable instruction is used to instruct the processor to perform the following steps of stretching a signal of a second processing length in the second-channel signal of the current frame into a signal of a second alignment processing length to obtain the second-channel signal of the current frame after delay alignment processing, where the second processing length is determined based on the inter-channel time difference of the previous frame and the second alignment processing length, and the second processing length is less than the second alignment processing length.

Optionally, the second processing length is a difference between the second alignment processing length and an absolute value of the inter-channel time difference of the previous frame.

Optionally, a start point of the signal of the second processing length is located after a start point of the signal of the second alignment processing length, and a length between the start point of the signal of the second processing length and the start point of the signal of the second alignment processing length is the absolute value of the inter-channel time difference of the previous frame.

Optionally, a start point of the signal of the second alignment processing length is located at a start point of the second-channel signal of the current frame or after the start point of the second-channel signal of the current frame, and a length between the start point of the signal of the second alignment processing length and an end point of the second-channel signal of the current frame is greater than or equal to the second alignment processing length.

Optionally, a length between the start point of the signal of the second alignment processing length and the start point of the second-channel signal of the current frame is equal to a second preset length, and a length between the start point of the signal of the first alignment processing length and the start point of the first-channel signal of the current frame is equal to a sum of the second preset length and the second alignment processing length.

Optionally, the first alignment processing length is less than or equal to a frame length of the current frame, and the first alignment processing length is either a preset length or meets the following formula:

$$L\_next\_target = \frac{|cur\_itd| \times L}{|prev\_itd| + |cur\_itd|},$$

where L_next_target is the first alignment processing length, cur_itd is the inter-channel time difference of the current frame, prev_itd is the inter-channel time difference of the previous frame, and L is a processing length of delay alignment processing.

Optionally, the second alignment processing length is less than or equal to the frame length of the current frame, and the second alignment processing length is either a preset length or meets the following formula:

$$L\_pre\_target = \frac{|prev\_itd| \times L}{|prev\_itd| + |cur\_itd|},$$

where L_pre_target is the second alignment processing length, cur_itd is the inter-channel time difference of the current frame, prev_itd is the inter-channel time difference of the previous frame, and L is the processing length of delay alignment processing.

Optionally, the processing length of delay alignment processing is less than or equal to the frame length of the current frame, and the processing length of delay alignment processing is either a preset length or meets the following formula:

$$L = \frac{(|prev\_itd| + |cur\_itd|) \times L\_init}{MAX\_DELAY\_CHANGE},$$

where L is the processing length of delay alignment processing, MAX_DELAY_CHANGE is a maximum difference value between inter-channel time differences of adjacent frames, and L_init is a preset processing length of delay alignment processing.

An embodiment of this application provides a stereo signal processing method, applied to a decoder side of a stereo codec, where the method includes determining an inter-channel time difference of a current frame based on a received bitstream, where the inter-channel time difference of the current frame is a time difference between a first-channel signal of the current frame and a second-channel signal of the current frame, and if a sign of the inter-channel time difference of the current frame is different from a sign of an inter-channel time difference of a previous frame of the current frame, performing delay recovery processing on the first-channel signal of the current frame based on the inter-channel time difference of the current frame, and performing delay recovery processing on the second-channel signal of the current frame based on the inter-channel time difference of the previous frame, where the first-channel signal is a target-channel signal of the current frame, and the second-channel signal is on a same channel as a target-channel signal of the previous frame.

According to the method provided in this application, when the sign of the inter-channel time difference of the current frame is different from the sign of the inter-channel time difference of the previous frame of the current frame, delay recovery processing is performed on the first-channel signal of the current frame based on the inter-channel time difference of the current frame, and delay recovery processing is performed on the second-channel signal of the current frame based on the inter-channel time difference of the previous frame. Therefore, delay recovery processing of the current frame can be performed based on an actual inter-channel time difference, thereby ensuring a better alignment effect, and avoiding a problem that because the inter-channel time difference of the current frame is forcibly set to zero, a correlation component between the two channels of the current frame after delay recovery processing cannot be offset, and consequently, energy of a secondary-channel signal of the current frame after time-domain downmixing increases, affecting decoded signal quality.

Optionally, performing delay recovery processing on the first-channel signal of the current frame based on the inter-channel time difference of the current frame includes stretching a signal of a third processing length in the first-channel signal of the current frame into a signal of a third alignment processing length, to obtain the first-channel signal of the current frame after delay recovery processing, where the third processing length is determined based on the inter-channel time difference of the current frame and the third alignment processing length, and the third processing length is less than the third alignment processing length.

Optionally, the third processing length is a difference between the third alignment processing length and an absolute value of the inter-channel time difference of the current frame.

Optionally, a start point of the signal of the third processing length is located after a start point of the signal of the third alignment processing length, and a length between the start point of the signal of the third processing length and the start point of the signal of the third alignment processing length is the absolute value of the inter-channel time difference of the current frame.

Optionally, the start point of the signal of the third processing length is located at a start point of the first-channel signal of the current frame or after the start point of the first-channel signal of the current frame, and a length between the start point of the signal of the third processing length and an end point of the first-channel signal of the current frame is greater than or equal to the difference between the third alignment processing length and the absolute value of the inter-channel time difference of the current frame.

Optionally, performing delay recovery processing on the second-channel signal of the current frame based on the inter-channel time difference of the previous frame includes compressing a signal of a fourth processing length in the second-channel signal of the current frame into a signal of a fourth alignment processing length to obtain the second-channel signal of the current frame after delay recovery processing, where the fourth processing length is determined based on the inter-channel time difference of the previous frame and the fourth alignment processing length, and the fourth processing length is greater than the fourth alignment processing length.

Optionally, the fourth processing length is a sum of an absolute value of the inter-channel time difference of the previous frame and the fourth alignment processing length.

Optionally, a start point of the signal of the fourth processing length is located before a start point of the signal of the fourth alignment processing length, and a length between the start point of the signal of the fourth processing length and the start point of the signal of the fourth alignment processing length is the absolute value of the inter-channel time difference of the previous frame.

Optionally, the start point of the signal of the fourth alignment processing length is located at a start point of the second-channel signal of the current frame or after the start point of the second-channel signal of the current frame, and a length between the start point of the signal of the fourth alignment processing length and an end point of the second-channel signal of the current frame is greater than or equal to the fourth alignment processing length.

Optionally, a length between the start point of the signal of the fourth alignment processing length and the start point of the second-channel signal of the current frame is equal to a fourth preset length, and a length between the start point of the signal of the third alignment processing length and the start point of the first-channel signal of the current frame is equal to a sum of the fourth preset length and the fourth alignment processing length.

Optionally, the third alignment processing length is either a preset length or meets the following formula:

$$\text{L2\_next\_target} = \frac{|\text{cur\_itd}| \times L}{|\text{prev\_itd}| + |\text{cur\_itd}|},$$

where L2_next_target is the third alignment processing length, cur_itd is the inter-channel time difference of the current frame, prev_itd is the inter-channel time difference of the previous frame, and L is a processing length of delay alignment processing.

Optionally, the fourth alignment processing length is either a preset length or meets the following formula:

$$\text{L2\_pre\_target} = \frac{|\text{prev\_itd}| \times L}{|\text{prev\_itd}| + |\text{cur\_itd}|},$$

where L2_pre_target is the fourth alignment processing length, cur_itd is the inter-channel time difference of the current frame, prev_itd is the inter-channel time difference of the previous frame, and L is the processing length of delay alignment processing.

Optionally, processing length of delay alignment processing is either a preset length or meets the following formula:

$$L = \frac{(|\text{prev\_itd}| + |\text{cur\_itd}|) \times \text{L\_init}}{\text{MAX\_DELAY\_CHANGE}},$$

where L is the processing length of delay alignment processing, MAX_DELAY_CHANGE is a maximum difference value between inter-channel time differences of adjacent frames, and L_init is a preset processing length of delay alignment processing.

An embodiment of this application provides a stereo signal processing apparatus that may perform and implement any stereo signal processing method provided in the foregoing method.

In a possible design, the stereo signal processing apparatus includes a plurality of functional modules, for example, includes a processing unit and a transceiver unit configured to implement any stereo signal processing method provided in the foregoing. Therefore, when a sign of an inter-channel time difference of a current frame is different from a sign of an inter-channel time difference of a previous frame of the current frame, delay recovery processing is performed on a first-channel signal of the current frame based on the inter-channel time difference of the current frame, and delay recovery processing is performed on a second-channel signal of the current frame based on the inter-channel time difference of the previous frame. Therefore, delay recovery processing of the current frame can be performed based on an actual inter-channel time difference, thereby ensuring a better alignment effect, and avoiding a problem that because the inter-channel time difference of the current frame is forcibly set to zero, a correlation component between the two channels of the current frame after delay recovery processing cannot be offset, and consequently, energy of a secondary-channel signal of the current frame after time-domain downmixing increases, affecting decoded signal quality.

An embodiment of this application provides a stereo signal processing apparatus, where the apparatus includes a processor and a memory, the memory stores an executable instruction, and the executable instruction is used to instruct the processor to perform the following steps of determining an inter-channel time difference of a current frame based on a received bitstream, where the inter-channel time difference of the current frame is a time difference between a first-channel signal of the current frame and a second-channel signal of the current frame, and if a sign of the inter-channel time difference of the current frame is different from a sign of an inter-channel time difference of a previous frame of the current frame, performing delay recovery processing on the first-channel signal of the current frame based on the inter-channel time difference of the current frame, and performing delay recovery processing on the second-channel signal of the current frame based on the inter-channel time difference of the previous frame, where the first-channel signal is a target-channel signal of the current frame, and the second-channel signal is on a same channel as a target-channel signal of the previous frame.

Optionally, when performing delay recovery processing on the first-channel signal of the current frame based on the inter-channel time difference of the current frame, the executable instruction is used to instruct the processor to perform the following steps of stretching a signal of a third processing length in the first-channel signal of the current frame into a signal of a third alignment processing length to obtain the first-channel signal of the current frame after delay recovery processing, where the third processing length is determined based on the inter-channel time difference of the current frame and the third alignment processing length, and the third processing length is less than the third alignment processing length.

Optionally, the third processing length is a difference between the third alignment processing length and an absolute value of the inter-channel time difference of the current frame.

Optionally, a start point of the signal of the third processing length is located after a start point of the signal of the third alignment processing length, and a length between the start point of the signal of the third processing length and the start point of the signal of the third alignment processing length is the absolute value of the inter-channel time difference of the current frame.

Optionally, the start point of the signal of the third processing length is located at a start point of the first-channel signal of the current frame or after the start point of the first-channel signal of the current frame, and a length between the start point of the signal of the third processing length and an end point of the first-channel signal of the current frame is greater than or equal to the difference between the third alignment processing length and the absolute value of the inter-channel time difference of the current frame.

Optionally, when performing delay recovery processing on the second-channel signal of the current frame based on the inter-channel time difference of the previous frame, the executable instruction is used to instruct the processor to perform the following steps of compressing a signal of a fourth processing length in the second-channel signal of the current frame into a signal of a fourth alignment processing length to obtain the second-channel signal of the current frame after delay recovery processing, where the fourth processing length is determined based on the inter-channel time difference of the previous frame and the fourth alignment processing length, and the fourth processing length is greater than the fourth alignment processing length.

Optionally, the fourth processing length is a sum of an absolute value of the inter-channel time difference of the previous frame and the fourth alignment processing length.

An embodiment of this application further provides a computer storage medium, where the storage medium stores a software program, and when the software program is read and executed by one or more processors, the stereo signal processing method provided in any one of the foregoing designs may be implemented.

An embodiment of this application further provides a system. The system includes the stereo signal processing apparatus provided in any one of the foregoing designs. Optionally, the system may further include another device that interacts with the stereo signal processing apparatus in the solution provided in the embodiments of this application.

An embodiment of this application further provides a computer program product including an instruction. When the computer program product runs on a computer, the computer performs the methods in the foregoing aspects.

DESCRIPTION OF EMBODIMENTS

The following further describes in detail this application with reference to accompanying drawings.

Embodiments of this application are applicable to encoding and decoding of an audio signal, especially a stereo signal. Currently, stereo signal encoding mainly includes the following processes time-domain preprocessing, delay estimation and encoding, delay alignment, time-domain analysis, downmixed parameter extraction and encoding, time-domain downmixing processing, downmixed signal encoding, and the like. A decoding process of the audio signal may be contrary to the encoding process of the audio signal, and details are not described herein.

The encoding process is merely an example, and an actual encoding process may change. This is not limited in the embodiments of this application. In the embodiments of this application, delay alignment is mainly processed. The following describes delay alignment in detail. In addition, for other steps of the encoding process, refer to description in other approaches. Details are not described one by one herein.

In the embodiments of this application, each frame of stereo signal includes a left-channel signal and a right-channel signal, a frame length is N, and N is a positive integer greater than 0.

Figure 1:
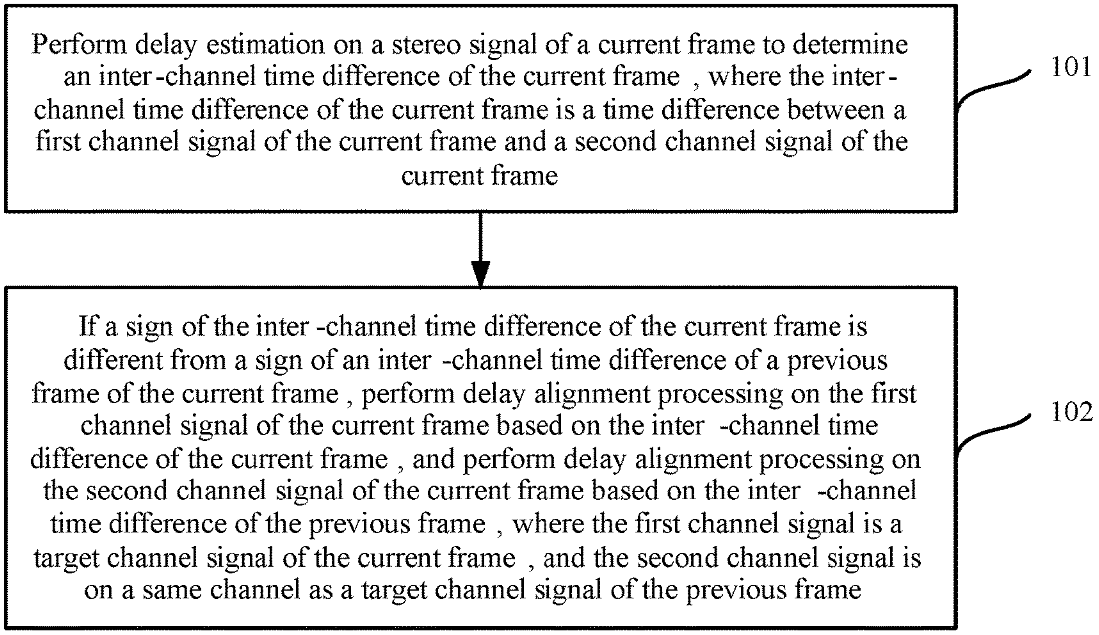
FIG. 1 is a schematic flowchart of a stereo signal processing method according to an embodiment of this application.

FIG. 1 is a schematic flowchart of a stereo signal processing method according to an embodiment of this application.

Referring to FIG. 1, the method includes the following steps.

Step 101: Perform delay estimation on a stereo signal of a current frame to determine an inter-channel time difference of the current frame, where the inter-channel time difference of the current frame is a time difference between a first-channel signal of the current frame and a second-channel signal of the current frame.

Step 102: If a sign of the inter-channel time difference of the current frame is different from a sign of an inter-channel time difference of a previous frame of the current frame, perform delay alignment processing on the first-channel signal of the current frame based on the inter-channel time difference of the current frame, and perform delay alignment processing on the second-channel signal of the current frame based on the inter-channel time difference of the previous frame, where the first-channel signal is a target-channel signal of the current frame, and the second-channel signal is on a same channel as a target-channel signal of the previous frame.

The previous frame of the current frame and the current frame are two adjacent frames, and are consecutive in a time sequence.

In step 101, a process of performing delay estimation on the current frame may be as follows.

Step 1: Perform time-domain preprocessing on a left-channel signal and a right-channel signal of the current frame.

If a sampling rate of the stereo signal is 16 kilohertz (KHz), duration of one frame of stereo signal is 20 milliseconds (ms), and a frame length is denoted as N, N=320, that is, the frame length is 320 sampling points. The stereo signal of the current frame includes the left-channel signal of the current frame and the right-channel signal of the current frame, the left-channel signal of the current frame is denoted as $x_L(n)$, and the right-channel signal of the current frame is denoted as $x_R(n)$, where n is a sampling point sequence number, and n=0, 1, . . . , N−1.

Performing time-domain preprocessing on a left-channel signal and a right-channel signal of the current frame may include performing high-pass filtering processing on the left-channel signal and the right-channel signal of the current frame to obtain a preprocessed left-channel signal and a preprocessed right-channel signal of the current frame, where the preprocessed left-channel signal of the current frame is denoted as $x_{L\_HP}(n)$, the processed right-channel signal of the current frame is denoted as $x_{R\_HP}(n)$, n is a sampling point sequence number, and n=0, 1, . . . , N−1. High-pass filtering processing may be an infinite impulse response (IIR) filter with a cut-off frequency 20 hertz (Hz), or may be performed by another type of filter. For example, a transfer function of a high-pass filter with a sampling rate 16 KHz and a corresponding cutoff frequency 20 Hz is:

$$H_{20Hz}(z) = \frac{b_0 + b_1 z^{-1} + b_2 z^{-2}}{1 + a_1 z^{-1} + a_2 z^{-2}}, \tag{1}$$

where $b_0$=0.994461788958195, $b_1$=−1.988923577916390, $b_2$=0.994461788958195, $a_1$=1.988892905899653, $a_2$=−0.988954249933127, z is a transform factor of Z-transform. Correspondingly, signals obtained after time-domain filtering are:

$$x_{L\_HP}(n)=b_0*x_L(n)+b_1*x_L(n-1)+b_2*x_L(n-2)-a_1*x_{L\_HP}(n-1)-a_2*x_{L\_HP}(n-2), \text{ and} \tag{2}$$

$$x_{R\_HP}(n)=b_0*x_R(n)+b_1*x_R(n-1)+b_2*x_R(n-2)-a_1*x_{R\_HP}(n-1)-a_2*x_{R\_HP}(n-2). \tag{3}$$

It should be noted that time-domain preprocessing on the left-channel signal and the right-channel signal of the current frame is not mandatory. If there is no time-domain preprocessing step, the left-channel signal and the right-channel signal that are used for delay estimation and delay alignment processing are a left-channel signal and a right-channel signal in an original stereo signal. Herein, the left-channel signal and the right-channel signal in the original stereo signal are collected pulse code modulation (PCM) signals obtained after analog-to-digital (A/D) conversion. In addition, in this embodiment of this application, the sampling rate of the signal may further be 8 KHz, 16 KHz, 32 KHz, 44.1 KHz, 48 KHz, or the like. This is not limited in this embodiment of this application.

The preprocessed left-channel signal of the current frame is denoted as $\tilde{x}_L(n)$, and the preprocessed right-channel signal of the current frame is denoted as $\tilde{x}_R(n)$, where n is a sampling point sequence number, and n=0,1, . . . , N−1.

In addition, preprocessing may be another processing manner such as pre-emphasis processing in addition to high-pass filtering processing described in this embodiment of this application. This is not limited in this embodiment of this application.

Step 2: Perform delay estimation based on the preprocessed left-channel signal and the preprocessed right-channel signal of the current frame, to obtain the inter-channel time difference of the current frame.

For example, a cross correlation coefficient between the left channel and the right channel may be calculated based on the preprocessed left-channel signal and the preprocessed right-channel signal of the current frame. Then, a maximum value of the cross correlation coefficient is determined, and the inter-channel time difference of the current frame is determined based on the maximum value of the cross correlation coefficient.

Further, $T_{max}$ corresponds to a maximum value of the inter-channel time difference at a current sampling rate, and $T_{min}$ corresponds to a minimum value of the inter-channel time difference at the current sampling rate. $T_{max}$ and $T_{min}$ are preset real numbers, and $T_{max}$ is greater than $T_{min}$. In this embodiment of this application, when the sampling rate is 16 KHz, $T_{max}$=40, and $T_{min}$=−40. When the sampling rate is 32 KHz, $T_{max}$=80, and $T_{min}$=−80. In a case of another sampling rate, values of $T_{max}$ and $T_{min}$ are not further described.

The cross correlation coefficient between the left channel and the right channel may be calculated in the following manner.

If $T_{min}$ is less than or equal to 0 and $T_{max}$ is greater than 0, within a range of $T_{min} \le i \le 0$, the cross correlation coefficient between the left channel and the right channel meets the following formula:

$$c(i) = \frac{1}{N+i} \sum_{j=0}^{N-1+i} \tilde{x}_R(j) \cdot \tilde{x}_L(j-i). \tag{4}$$

Within a range of $0 \le i \le T_{max}$, the cross correlation coefficient between the left channel and the right channel meets the following formula:

$$c(i) = \frac{1}{N+i} \sum_{j=0}^{N-1-i} \tilde{x}_L(j) \cdot \tilde{x}_R(j+i), \tag{5}$$

where N is the frame length, $\tilde{x}_L(j)$; is the preprocessed left-channel signal of the current frame, $\tilde{x}_R(j)$ is the preprocessed right-channel signal of the current frame, c(i) is the cross correlation coefficient between the left channel and the right channel, and i is an index value of the cross correlation coefficient.

If $T_{min}$ is less than or equal to 0 and $T_{max}$ is less than or equal to 0, within a range of $T_{min} \le i \le T_{max}$, the cross correlation coefficient between the left channel and the right channel meets the following formula:

$$c(i) = \frac{1}{N+i} \sum_{j=0}^{N-1+i} \tilde{x}_R(j) \cdot \tilde{x}_L(j-i), \quad (6)$$

where N is the frame length, $\tilde{x}_L(j)$ is the preprocessed left-channel signal of the current frame, $\tilde{x}_R(j)$ is the preprocessed right-channel signal of the current frame, c(i) is the cross correlation coefficient between the left channel and the right channel, and i is an index value of the cross correlation coefficient.

If the set $T_{min}$ is greater than 0 and the set $T_{max}$ is greater than 0, within a range of $T_{min} \leq i \leq T_{max}$, the cross correlation coefficient between the left channel and the right channel meets the following formula:

$$c(i) = \frac{1}{N+i} \sum_{j=0}^{N-1-i} \tilde{x}_L(j) \cdot \tilde{x}_R(j+i), \quad (7)$$

where N is the frame length, $\tilde{x}_L(j)$ is the preprocessed left-channel signal of the current frame, $\tilde{x}_R(j)$ is the preprocessed right-channel signal of the current frame, c(i) is the is the cross correlation coefficient between the left channel and the right channel, and i is an index value of the cross correlation coefficient.

Finally, an index value corresponding to the obtained maximum value of the cross correlation coefficient is used as the inter-channel time difference of the current frame.

With reference to the foregoing description, in this embodiment of this application, when $T_{max}$ is equal to 40 and $T_{min}$ is equal to −40, the maximum value of the cross correlation coefficient c(i) between the left channel and the right channel is searched for within a range of $T_{min} \leq i \leq T_{max}$, and the index value corresponding to the obtained maximum value of the cross correlation coefficient is used as the inter-channel time difference of the current frame, which is denoted as cur_itd.

After the inter-channel time difference of the current frame is estimated, quantization and encoding are performed on the estimated inter-channel time difference of the current frame, a quantized code index is written into a bitstream, and the bitstream is transmitted to a decoder side. Optionally, a quantized and encoded value is used as the inter-channel time difference of the current frame.

In addition to the delay estimation method described above, the inter-channel time difference of the current frame may alternatively be determined according to another delay estimation method. For example, the cross correlation coefficient between the left channel and the right channel is calculated based on the preprocessed left-channel signal and the preprocessed right-channel signal of the current frame or the left-channel signal and the right-channel signal of the current frame. Then, long-time smoothing processing is performed based on a cross correlation coefficient between a left channel and a right channel of the first M1 audio frames (M1 is an integer greater than or equal to 1), and the calculated cross correlation coefficient between the left channel and the right channel of the current frame, to obtain a smoothed cross correlation coefficient between the left channel and the right channel. Then, a maximum value of the smoothed cross correlation coefficient between the left channel and the right channel is searched for within a range of $T_{min} \leq i \leq T_{max}$, and an index value corresponding to the maximum value is obtained and used as the inter-channel time difference of the current frame. For another example, inter-frame smoothing processing may alternatively be performed based on inter-channel time differences of the first M2 audio frames (M2 is an integer greater than or equal to 1) and the estimated inter-channel time difference of the current frame, and a smoothed inter-channel time difference is used as the inter-channel time difference of the current frame.

It should be noted that, in this embodiment of this application, the estimated inter-channel time difference of the current frame is used as the finally determined inter-channel time difference of the current frame, but a method for estimating the inter-channel time difference of the current frame includes but is not limited to the method described above.

In step 102, the sign may refer to a positive sign (+) or a negative sign (−). In this embodiment of this application, the previous frame is located before the current frame, and is adjacent to the current frame.

When the sign of the inter-channel time difference of the current frame is different from the sign of the inter-channel time difference of the previous frame, delay alignment processing may be separately performed on the first-channel signal and the second-channel signal of the current frame. For ease of description, a channel corresponding to the first-channel signal of the current frame is referred to as a first channel, and a channel corresponding to the second-channel signal of the current frame is referred to as a second channel in the following. It should be noted that the first channel is a target channel of the current frame, and may further be referred to as a next-frame target channel, or may be referred to as an indication target channel of the current frame, or may be referred to as another channel other than a target channel of the previous frame of the current frame. Correspondingly, the second channel is a reference channel of the current frame, and the second channel is a channel that is in the two channels of the stereo signal and that is the same as the target channel of the previous frame, and may further be referred to as a previous-frame target channel, or may be referred to as an indication reference channel of the current frame, or may be referred to as a channel other than the target channel of the current frame. For example, if the target channel of the previous frame is a left channel, the first-channel signal is a right-channel signal in the current frame, and the second-channel signal is a left-channel signal in the current frame. If the target channel of the previous frame is a right channel, the first-channel signal is a left-channel signal in the current frame, and the second-channel signal is a right-channel signal in the current frame.

In this embodiment of this application, the target channel and the reference channel are dedicated terms. Further, in an existing algorithm for performing delay alignment based on an inter-channel time difference, one channel needs to be selected from a left channel and a right channel, and delay alignment processing is performed on a signal of the selected channel. This channel is referred to as a target channel. The other channel is used as a reference for performing delay alignment processing on the target channel, and is referred to as a reference channel. In the method proposed in this embodiment of this application, when the sign of the inter-channel time difference of the current frame is different from the sign of the inter-channel time difference of the previous frame, delay alignment processing needs to be performed on both channels. Therefore, when the sign of the inter-channel time difference of the current frame is different from the sign of the inter-channel time difference of the previous frame, the first channel is the target channel of the current frame in a broad sense, and delay alignment processing needs to be performed on the target channel of the current frame, and the second channel is a reference channel of the current frame in a broad sense, and delay alignment processing also needs to be performed on the reference channel of the current frame.

Optionally, in this embodiment of this application, the target channel and a reference channel of the previous frame may be determined in the following manner to determine the first channel and the second channel. If the inter-channel time difference of the previous frame is less than 0, it may be considered that the target channel of the previous frame is the left channel. Because the second channel is a channel that is in the two channels of the stereo signal and that is the same as the target channel of the previous frame, the second channel is the left channel, and the first channel is the right channel. If the inter-channel time difference of the previous frame is greater than or equal to 0, it may be considered that the target channel of the previous frame is the right channel. Because the second channel is a channel that is in the two channels of the stereo signal and that is the same as the target channel of the previous frame, the second channel is the right channel, and the first channel is the left channel.

Optionally, in this embodiment of this application, the target channel and the reference channel of the current frame may alternatively be determined in the following manner to determine the first channel and the second channel. When the inter-channel time difference of the current frame is greater than or equal to 0, it may be considered that the target channel of the current frame is the right channel, that is, the first channel is the right channel, and the second channel is the left channel. When the inter-channel time difference of the current frame is less than 0, it may be considered that the target channel of the current frame is the left channel, that is, the first channel is the left channel, and the second channel is the right channel.

Optionally, in this embodiment of this application, the target channel and the reference channel of the previous frame may be directly determined based on an obtained target channel index or reference channel index of the previous frame to determine the first channel and the second channel.

In this embodiment of this application, there are a plurality of methods for performing delay alignment processing on the first-channel signal and the second-channel signal, which are separately described in the following.

1. Perform delay alignment processing on the first-channel signal of the current frame based on the inter-channel time difference of the current frame Further, a signal of a first processing length in the first-channel signal of the current frame is compressed into a signal of a first alignment processing length, to obtain the first-channel signal of the current frame after delay alignment processing. The first processing length is determined based on the inter-channel time difference of the current frame and the first alignment processing length, and the first processing length is greater than the first alignment processing length.

In this embodiment of this application, the first processing length may be a sum of an absolute value of the inter-channel time difference of the current frame and the first alignment processing length.

In this embodiment of this application, the first alignment processing length may be represented by L_next_target. The first alignment processing length is less than or equal to the frame length of the current frame, and the first alignment processing length may be a preset length, or may be determined in another manner. When the first alignment processing length is a preset length, the first alignment processing length may be L, L/2, L/3, or any length less than or equal to L, and L is a processing length of delay alignment processing. The processing length of delay alignment processing is less than or equal to the frame length of the current frame, that is, L is any preset positive integer that is less than or equal to a corresponding frame length N at a current sampling rate and that is greater than a maximum value of an absolute value of an inter-channel time difference. For example, L=290 or L=200. In this embodiment of this application, L may be set to different values for different sampling rates, or may be a uniform value. Generally, a value may be preset based on experience of a skilled person. For example, when a sampling rate is 16 KHz, L is set to 290. In this case, in this embodiment of this application, L_next_target=L/2=145.

In addition, in this embodiment of this application, a start point of the signal of the first processing length is located before a start point of the signal of the first alignment processing length, and a length between the start point of the signal of the first processing length and the start point of the signal of the first alignment processing length is the absolute value of the inter-channel time difference of the current frame.

In this embodiment of this application, the inter-channel time difference of the current frame is cur_itd, and abs (cur_itd) represents the absolute value of the inter-channel time difference of the current frame. For ease of description, abs(cur_itd) is referred to as a first delay length in the following description. The inter-channel time difference of the previous frame is prev_itd, and abs(prev_itd) represents an absolute value of the inter-channel time difference of the previous frame. For ease of description, abs(prev_itd) is referred to as a second delay length in the following description.

A specific location of the signal of the first processing length may be determined based on different actual conditions, which are separately described in the following.

First possible case is as follows.

Figure 2:
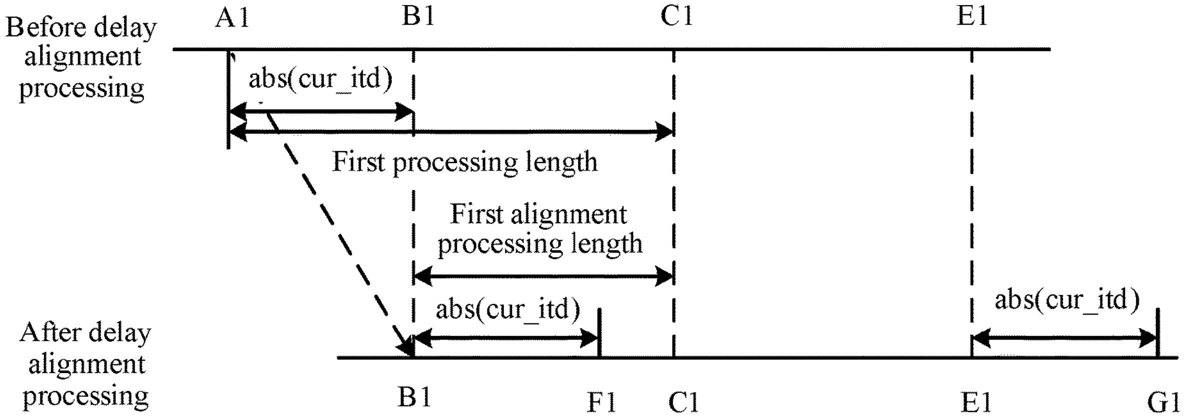
FIG. 2 is a schematic diagram of a stereo signal processing method according to an embodiment of this application.

FIG. 2 is a schematic diagram of delay alignment processing according to an embodiment of this application. In FIG. 2, for ease of description, a point in the first-channel signal before delay alignment processing and a point in the first-channel signal after compression processing that are at a same location are marked using a same coordinate, but this does not mean that signals at points with a same coordinate are the same. For example, both coordinates of a start point of the first-channel signal of the current frame are marked as B1 before delay alignment processing and after compression processing.

With reference to FIG. 2, the start point of the signal of the first alignment processing length is located at the start point B1 of the first-channel signal of the current frame. An end point of the signal of the first alignment processing length is C1, and a length from the start point B1 to the end point C1 is equal to the first alignment processing length, where B1=0, and C1=B1+L_next_target−1.

The start point A1 of the signal of the first processing length is located before the start point B1 of the signal of the first alignment processing length, and the length between the start point A1 of the signal of the first processing length and the start point B1 of the signal of the first alignment processing length is the absolute value of the inter-channel time difference of the current frame. That is, A1=B1−abs (cur_itd). An end point of the signal of the first processing length is C1, which is the same as the coordinate of the end point of the signal of the first alignment processing length.

In a process of delay alignment processing, a signal from point A1 to point C1 in the first-channel signal is compressed into a signal of the first alignment processing length, and a compressed signal of the first alignment processing length is used as a signal of the first alignment processing length that starts from the start point B1 in the first-channel signal after compression processing. In addition, an uncompressed signal in the first-channel signal of the current frame remains unchanged, that is, a signal from point C1+1 to point E1 in the first-channel signal before delay alignment processing is directly used as a signal from point C1+1 to point E1 in the first-channel signal after compression processing. E1 is an end point of the first-channel signal of the current frame, the frame length of the current frame is N, and E1=N−1.

In this embodiment of this application, a signal of the first delay length may be manually reconstructed based on a signal from point E2−abs(cur_itd)+1 to point E2 in the second-channel signal of the current frame, and the reconstructed signal of the first delay length is used as a signal from point E1+1 to point G1 in the first-channel signal after compression processing, where E2 is an end point of the second-channel signal of the current frame, E2=E1, and G1=E1+abs(cur_itd).

It should be noted that how to reconstruct the signal of the first delay length is not limited in this embodiment of this application. For example, a signal from point E1−abs(cur_itd)+1 to point E1 in the second-channel signal of the current frame may be directly used as the reconstructed signal of the first delay length.

Finally, in the first-channel signal after compression processing, N sampling points starting from point F1 are used as the first-channel signal of the current frame after delay alignment processing. That is, a start point of the first-channel signal of the current frame after delay alignment processing is point F1, and an end point is point G1. Point F1 is located after the start point of the first-channel signal of the current frame, and a length between point F1 and the start point of the first-channel signal of the current frame is the first delay length. Point G1 is located after the end point of the first-channel signal of the current frame, and a length between point G1 and the end point of the first-channel signal of the current frame is the first delay length. That is, F1=B1+abs(cur_itd).

For example, with reference to FIG. 2, if the first channel of the current frame is the left channel and the second channel is the right channel, a signal from point A1 to point C1 on the left channel is compressed into a signal of the first alignment processing length, and a compressed signal of the first alignment processing length is used as a signal of the first alignment processing length in the left-channel signal after compression processing (that is, a signal from point B1 to point C1 in the left-channel signal after compression processing). Then, a signal from point C1+1 to point E1 in the left-channel signal before compression processing is directly used as a signal from point C1+1 to point E1 in the left-channel signal of the current frame after compression processing. Then, a signal of the first delay length is reconstructed based on a signal of the first delay length (namely, a signal from point E1−abs(cur_itd)+1 to point E1 in the right-channel signal of the current frame) before the end point in the right-channel signal of the current frame, and the reconstructed signal of the first delay length is used as a signal of the first delay length (namely, a signal from point E1+1 to point G1 in the left-channel signal after compression processing) after the end point in the left-channel signal after compression processing. Finally, a signal from point F1 to point G1 in the signal obtained after compression processing is used as the left-channel signal of the current frame after delay alignment processing.

When the first channel of the current frame is a right channel and the second channel is a left channel, refer to the foregoing description. Details are not described herein.

Second possible case is as follows.

Figure 3:
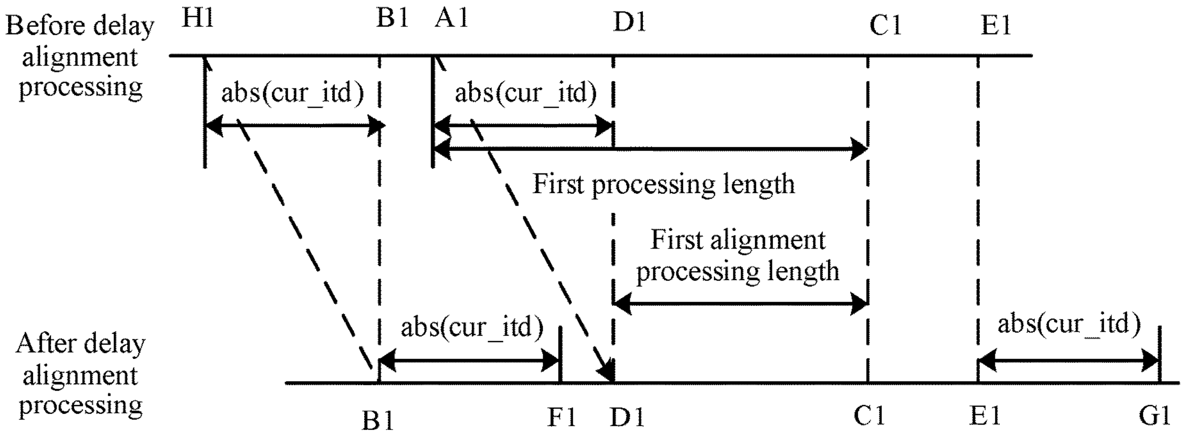
FIG. 3 is a schematic diagram of a stereo signal processing method according to an embodiment of this application.

FIG. 3 is a schematic diagram of stereo signal processing according to an embodiment of this application. In FIG. 3, for ease of description, a point in the first-channel signal before delay alignment processing and a point in the first-channel signal after compression processing that are at a same location are marked using a same coordinate, but this does not mean that signals at points with a same coordinate are the same. For example, both coordinates of a start point of the first-channel signal of the current frame are marked as B1 before delay alignment processing and after compression processing.

With reference to FIG. 3, a start point D1 of the signal of the first alignment processing length is located after the start point B1 of the first-channel signal of the current frame, and a length between the start point D1 of the signal of the first alignment processing length and an end point E1 of the first-channel signal of the current frame is greater than or equal to the first alignment processing length. An end point of the signal of the first alignment processing length is C1, and a length from the start point D1 to the end point C1 is equal to the first alignment processing length, where C1=D1+L_next_target−1.

In FIG. 3, the frame length of the current frame is N, the start point of the first-channel signal of the current frame is B1=0, and the end point of the first-channel signal of the current frame is E1=N−1. The start point D1 of the first alignment processing length is located after the start point B1 of the first-channel signal of the current frame, and the length between the start point D1 of the signal of the first alignment processing length and the end point E1 of the first-channel signal of the current frame is greater than or equal to the first alignment processing length. For ease of description, a length between the start point D1 of the signal of the first alignment processing length and the start point B1 of the first-channel signal is referred to as a first preset length in the following. The first preset length is greater than 0 and is less than or equal to a difference value between the frame length of the current frame and the first alignment processing length, and may be further set based on an actual situation. Details are not described herein.

A start point A1 of the signal of the first processing length is located before the start point D1 of the signal of the first alignment processing length, and a length between the start point A1 of the signal of the first processing length and the start point D1 of the signal of the first alignment processing length is the absolute value of the inter-channel time difference of the current frame. That is, the start point of the signal of the first processing length is A1=D1−abs(cur_itd), and an end point of the signal of the first processing length is C1, which is the same as the coordinate of the end point of the signal of the first alignment processing length.

In this embodiment of this application, in a process of delay alignment processing, during signal compression, a signal of the first preset length that is in the first-channel signal and that is located before the start point of the signal of the first processing length may be directly used as a signal of the first preset length that starts from the start point of the first-channel signal after compression processing. That is, a signal from point H1 to point A1-1 in the first-channel signal is used as a signal from point B1 to point D1-1 in the compressed first-channel signal, where H1=B1−abs(cur_itd).

In a signal compression process, a signal from point A1 to point C1 in the first-channel signal is compressed into a signal of the first alignment processing length, and a compressed signal of the first alignment processing length is used as a signal of the first alignment processing length that starts from point D1 in the first-channel signal after compression processing. That is, the compressed signal of the first alignment processing length is directly used as a signal from point D1 to point C1 in the first-channel signal after compression processing.

In addition, an uncompressed signal in the first-channel signal of the current frame remains unchanged, that is, a signal from point C1+1 to point E1 in the first-channel signal of the current frame before delay alignment processing is directly used as a signal from point C1+1 to point E1 in the first-channel signal after compression processing. E1 is the end point of the first-channel signal of the current frame, the frame length of the current frame is N, and E1=N−1.

In this embodiment of this application, a signal of the first delay length may be manually reconstructed based on a signal from point E2−abs(cur_itd)+1 to point E2 in the second-channel signal of the current frame, and the reconstructed signal of the first delay length is used as a signal from point E1+1 to point G1 in the first-channel signal after compression processing, where E2 is an end point of the second-channel signal of the current frame, E2=E1, and G1=E1+abs(cur_itd).

It should be noted that how to reconstruct the signal of the first delay length is not limited in this embodiment of this application. For example, the signal from point E2-abs(cur_itd)+1 to point E2 in the second-channel signal of the current frame may be directly used as the reconstructed signal of the first delay length.

Finally, in the first-channel signal after compression processing, N sampling points starting from point F1 are used as the first-channel signal of the current frame after delay alignment processing. That is, a start point of the first-channel signal of the current frame after delay alignment processing is point F1, and an end point is point G1, where F1=B1+abs(cur_itd), and G1=E1+abs(cur_itd).

For example, with reference to FIG. 3, the first channel of the current frame is a left channel, and the second channel is a right channel. A signal from point H1 to point A1-1 in the left-channel signal is directly used as a signal from point B1 to point D1-1 in the left-channel signal after compression processing. A signal from point A1 to point C1 in the left-channel signal is compressed into a signal of the first alignment processing length, and a compressed signal of the first alignment processing length is used as a signal from point D1 to point C1 in the left-channel signal after compression processing. Then, a signal from point C1+1 to point E1 in the left-channel signal of the current frame is directly used as a signal from point C1+1 to point E1 in the left-channel signal after compression processing. Then, a signal of the first delay length is manually reconstructed based on a signal from point E2−abs(cur_itd)+1 to point E2 in the right-channel signal of the current frame, and the reconstructed signal of the first delay length is used as a signal from point E1+1 to point G1 in the left-channel signal after compression processing. Finally, a signal from point F1 to point G1 in the signal obtained after compression processing is used as the left-channel signal of the current frame after delay alignment processing.

When the first channel of the current frame is a right channel and the second channel is a left channel, refer to the foregoing description. Details are not described herein.

Third possible case is as follows.

Figure 4:
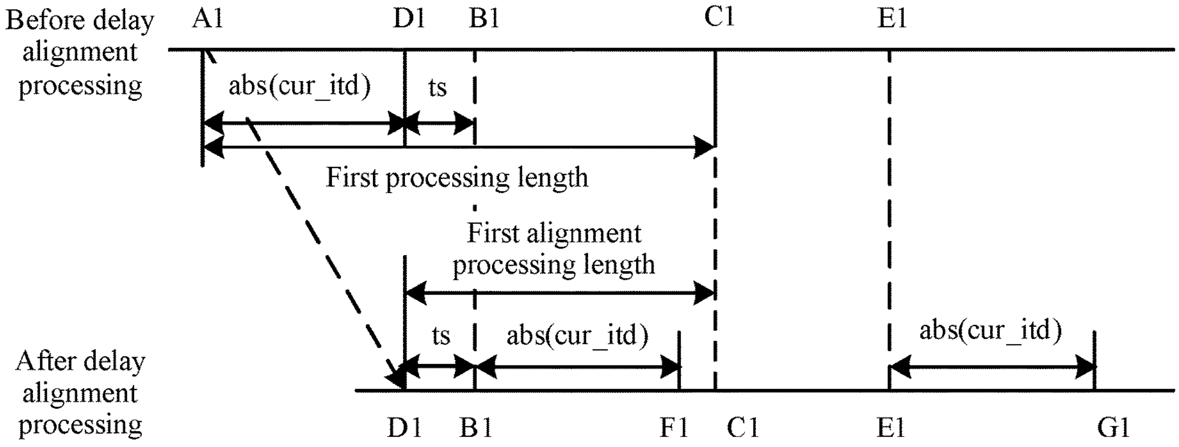
FIG. 4 is a schematic diagram of a stereo signal processing method according to an embodiment of this application.

FIG. 4 is a schematic diagram of stereo signal processing according to an embodiment of this application. In FIG. 4, for ease of description, a point in the first-channel signal before delay alignment processing and a point in the first-channel signal after compression processing that are at a same location are marked using a same coordinate, but this does not mean that signals at points with a same coordinate are the same. For example, both coordinates of an end point of the first-channel signal of the current frame are marked as E1 before delay alignment processing and after compression processing.

In FIG. 4, the frame length of the current frame is N, a start point of the first-channel signal of the current frame is B1=0, and the end point of the first-channel signal of the current frame is E1=N−1. A start point D1 of the first alignment processing length is located before the start point B1 of the first-channel signal of the current frame, a length between the start point D1 of the signal of the first alignment processing length and the start point B1 of the first-channel signal of the current frame is less than or equal to a transition section length, and a length between the start point D1 of the signal of the first alignment processing length and the end point E1 of the first-channel signal of the current frame is greater than or equal to a sum of the first alignment processing length and the transition section length. For ease of description, in this embodiment of this application and FIG. 4, the transition section length is represented by ts. In this case, D1=B1−ts. An end point of the signal of the first alignment processing length is C1, and a length from the start point D1 to the end point C1 is equal to the first alignment processing length, where C1=D1+L_next_target−1.

In this embodiment of this application, the transition section length may be a preset positive integer, and the preset positive integer may be set based on experience by a skilled person. The transition section length is usually less than or equal to a maximum value of the absolute value of the inter-channel time difference of the current frame. The transition section length may alternatively be calculated based on the inter-channel time difference of the current frame. For example, the transition section length is abs(cur_itd)/2.

A start point A1 of the signal of the first processing length is located before the start point D1 of the signal of the first alignment processing length, and a length between the start point A1 of the signal of the first processing length and the start point D1 of the signal of the first alignment processing length is the absolute value of the inter-channel time difference of the current frame. That is, the start point of the signal of the first processing length is A1=D1−abs(cur_itd), and an end point of the signal of the first processing length is C1, which is the same as the coordinate of the end point of the signal of the first alignment processing length.

It should be noted that, in FIG. 4, that the length between the start point D1 of the signal of the first alignment processing length and the start point B1 of the first-channel signal of the current frame is equal to the transition section length is used as an example for description. The length between the start point D1 of the signal of the first alignment processing length and the start point B1 of the first-channel signal of the current frame may alternatively be less than the transition section length, D1<B1, and D1+ts>B1. For a case of being less than the transition section length, refer to the description herein. Details are not further described.

In a process of delay alignment processing, a signal from point A1 to point C1 in the first-channel signal is compressed into a signal of the first alignment processing length, and a compressed signal of the first alignment processing length is used as a signal of the first alignment processing length that starts from point D1 in the first-channel signal after compression processing. That is, the compressed signal of the first alignment processing length is used as a signal from point D1 to point C1 in the first-channel signal after compression processing.

In addition, an uncompressed signal in the first-channel signal of the current frame remains unchanged, that is, a signal from point C1+1 to point E1 in the first-channel signal of the current frame before delay alignment processing is directly used as a signal from point C1+1 to point E1 in the first-channel signal after compression processing. E1 is the end point of the first-channel signal of the current frame, the frame length of the current frame is N, and E1=N−1.

In this embodiment of this application, a signal of the first delay length may be manually reconstructed based on a signal from point E2−abs(cur_itd)+1 to point E2 in the second-channel signal of the current frame, and the reconstructed signal of the first delay length is used as a signal from point E1+1 to point G1 in the first-channel signal after compression processing, where E2 is an end point of the second-channel signal of the current frame, E2=E1, and G1=E1+abs(cur_itd).

It should be noted that how to reconstruct the signal of the first delay length is not limited in this embodiment of this application.

Finally, in the first-channel signal after compression processing, N sampling points starting from point F1 are used as the first-channel signal of the current frame after delay alignment processing. That is, a start point of the first-channel signal of the current frame after delay alignment processing is point F1, and an end point is point G1, where F1=B1+abs(cur_itd).

For example, with reference to FIG. 4, the first channel of the current frame is a left channel, and the second channel is a right channel. A signal from point A1 to point C1 in the left-channel signal is compressed into a signal of the first alignment processing length, and a compressed signal of the first alignment processing length is used as a signal from point D1 to point C1 in the left-channel signal after compression processing. Then, a signal from point C1+1 to point E1 in the left-channel signal of the current frame is directly used as a signal from point C1+1 to point E1 in the left-channel signal after compression processing. Then, a signal of the first delay length is manually reconstructed based on a signal from point E2−abs(cur_itd)+1 to point E2 in the right-channel signal of the current frame, and the reconstructed signal of the first delay length is used as a signal from point E1+1 to point G1 in the left-channel signal after compression processing. E2 is an end point of the right-channel signal of the current frame. Finally, a signal from point F1 to point G1 in the signal obtained after compression processing is used as the left-channel signal of the current frame after delay alignment processing.

When the first channel of the current frame is a right channel and the second channel is a left channel, refer to the foregoing description. Details are not described herein.

Optionally, to add smoothing between a real signal and a manually reconstructed signal, a smooth transition section may be further set, and a length of the smooth transition section is Ts2. The length of the smooth transition section may be set to a preset positive integer, and a difference between the length of the smooth transition section and the transition section length is less than or equal to a difference between the frame length and the first alignment processing length. For example, Ts2 is set to 10.

In this case, in a process of delay alignment processing, a signal from point A1 to point C1 in the first-channel signal is compressed into a signal of the first alignment processing length, a compressed signal of the first alignment processing length is used as a signal of the first alignment processing length that starts from point D1 in the first-channel signal after compression processing. That is, the compressed signal of the first alignment processing length is used as a signal from point D1 to point C1 in the first-channel signal after compression processing.

In addition, a signal from point C1+1 to point E1−Ts2 in the first-channel signal of the current frame before delay alignment processing is directly used as a signal from point C1+1 to point E1−Ts2 in the first-channel signal after compression processing. E1 is the end point of the first-channel signal of the current frame, the frame length of the current frame is N, and E1=N−1. A signal of the length of the smooth transition section is manually reconstructed based on a signal from point E2−abs(cur_itd)−Ts2+1 to point E2−abs(cur_itd) in the second-channel signal of the current frame, and the reconstructed signal of the length of the smooth transition section is used as a signal from point E1−Ts2+1 to point E1 of the first-channel signal after compression processing.

In this embodiment of this application, a signal of the first delay length may be manually reconstructed based on a signal from point E2−abs(cur_itd)+1 to point E2 in the second-channel signal of the current frame, and the reconstructed signal of the first delay length is used as a signal from point E1+1 to point G1 in the first-channel signal after compression processing, where E2 is an end point of the second-channel signal of the current frame, E2=E1, and G1=E1+abs(cur_itd).

It should be noted that how to reconstruct the signal of the first delay length and the signal of the length of the smooth transition section is not limited in this embodiment of this application.

It should be noted that, in the second possible case, a transition section length may also be set. For a specific method and step for setting the transition section length, and a process of performing delay alignment processing on the first-channel signal of the current frame after the transition section length is set, refer to the foregoing description. Details are not described herein. In the second possible case, a transition section length and a length of a smooth transition section may be further set. For a specific method and step for setting the transition section length and the length of the smooth transition section, and a process of performing delay alignment processing on the first-channel signal of the current frame after the transition section length and the length of the smooth transition section are set, refer to the foregoing description.

In the foregoing method, smoothing between frames is added by adding the transition section length or adding the transition section length and the length of the smooth transition section, accuracy of alignment between the two channel signals in the current frame after delay alignment processing is improved, and encoding quality is improved.

It should be noted that in this embodiment of this application, a method for compressing the signal of the first processing length may be compressing the signal using a cubic spline interpolation method, may be compressing the signal using a quadratic spline interpolation method, may be compressing the signal using a linear interpolation method, or may be compressing the signal using a B-spline interpolation method, such as a quadratic B-spline interpolation method or a cubic B-spline interpolation method. A specific compression method is not limited in this embodiment of this application, and compression may be processed using any technology.

2. Perform delay alignment processing on the second-channel signal of the current frame based on the inter-channel time difference of the previous frame Further, a signal of a second processing length in the second-channel signal is stretched into a signal of a second alignment processing length to obtain the second-channel signal of the current frame after delay alignment processing. The second processing length is determined based on the inter-channel time difference of the previous frame and the second alignment processing length, and the second processing length is less than the second alignment processing length.

In this embodiment of this application, the second processing length is a difference between the second alignment processing length and an absolute value of the inter-channel time difference of the previous frame. In this embodiment of this application, the second alignment processing length may be represented by L_pre_target.

The second alignment processing length may be a preset length, or may be determined in another manner. The second alignment processing length is less than or equal to the frame length of the current frame. When the second alignment processing length is a preset length, the second alignment processing length may be L, L/2, L/3, or any length less than or equal to L. L is any preset positive integer that is less than or equal to a corresponding frame length N at a current sampling rate and that is greater than a maximum value of an absolute value of an inter-channel time difference. For example, L=290 or L=200. In this embodiment of this application, L may be set to different values for different sampling rates, or may be a uniform value. Generally, a value may be preset based on experience of a skilled person. For example, when a sampling rate is 16 KHz, L is set to 290. In this embodiment of this application, L_pre_target=L/2=145.

In addition, a start point of the signal of the second processing length is located after a start point of the signal of the second alignment processing length, and a length between the start point of the signal of the second processing length and the start point of the signal of the second alignment processing length is the absolute value of the inter-channel time difference of the previous frame.

A specific location of the signal of the second processing length may be determined based on different actual conditions, which are separately described in the following.

First possible case is as follows.

Figure 5:
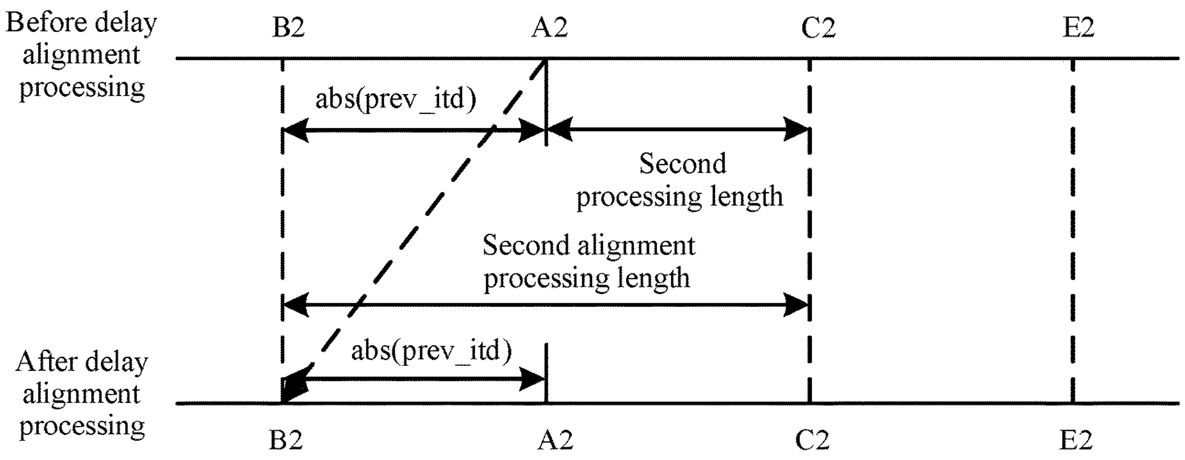
FIG. 5 is a schematic diagram of a stereo signal processing method according to an embodiment of this application.

FIG. 5 is a schematic diagram of stereo signal processing according to an embodiment of this application. In FIG. 5, for ease of description, a point in the second-channel signal before delay alignment processing and a point in the second-channel signal after stretching processing that are at a same location are marked using a same coordinate, but this does not mean that signals at points with a same coordinate are the same. For example, both coordinates of the start point of the second-channel signal of the current frame are marked as B2 before delay alignment processing and after stretching processing.

With reference to FIG. 5, the frame length of the current frame is N, the start point of the second-channel signal of the current frame is B2=0, and an end point of the second-channel signal of the current frame is E2=N−1. The start point of the second alignment processing length is located at the start point B2 of the second-channel signal of the current frame. An end point of the signal of the second alignment processing length is C2, and a length from the start point B2 to the end point C2 is equal to the second alignment processing length, where C2=B2+L_pre_target−1.

A start point A2 of the signal of the second processing length is located after the start point B2 of the second alignment processing length, and a length between the start point A2 of the signal of the second processing length and the start point B2 of the second alignment processing length is the absolute value of the inter-channel time difference of the previous frame. The start point of the signal of the second processing length is A2=B2+abs(prev_itd), and an end point of the signal of the second processing length is C2, which is the same as the coordinate of the end point of the signal of the second alignment processing length.

In a process of delay alignment processing, a signal from point A2 to point C2 in the second-channel signal is stretched into a signal of the second alignment processing length, and a stretched signal of the second alignment processing length is used as a signal of the second alignment processing length that starts from point B2 in the second-channel signal after stretching processing. That is, the stretched signal of the second alignment processing length is used as a signal from the start point B2 to point C2 in the second-channel signal after stretching processing.

In this embodiment of this application, during signal stretching, an unstretched signal in the second-channel signal of the current frame may remain unchanged, that is, a signal from point C2+1 to point E2 in the second-channel signal of the current frame is directly used as a signal from point C2+1 to point E2 in the second-channel signal after stretching processing. E2 is the end point of the second-channel signal of the current frame, the frame length of the current frame is N, and E2=N−1.

Finally, in the second-channel signal after stretching processing, N sampling points starting from the start point B2 are used as the second-channel signal of the current frame after delay alignment processing. That is, a start point of the second-channel signal of the current frame after delay alignment processing is B2, and an end point is E2.

For example, with reference to FIG. 5, the first channel of the current frame is a left channel, and the second channel is a right channel. A signal from point A2 to point C2 in a right-channel signal of the current frame is stretched into a signal of the second alignment processing length, and a stretched signal of the second alignment processing length is used as a signal from point B2 to point C2 in the right-channel signal after stretching processing. Then, a signal from point C2+1 to point E2 in the right-channel signal of the current frame is directly used as a signal from point C2+1 to point E2 in the right-channel signal after stretching processing. Finally, a signal from point B2 to point E2 in the signal obtained after stretching processing is used as the right-channel signal of the current frame after delay alignment processing.

When the first channel of the current frame is a right channel and the second channel is a left channel, refer to the foregoing description. Details are not described herein.

Second possible case is as follows.

Figure 6:
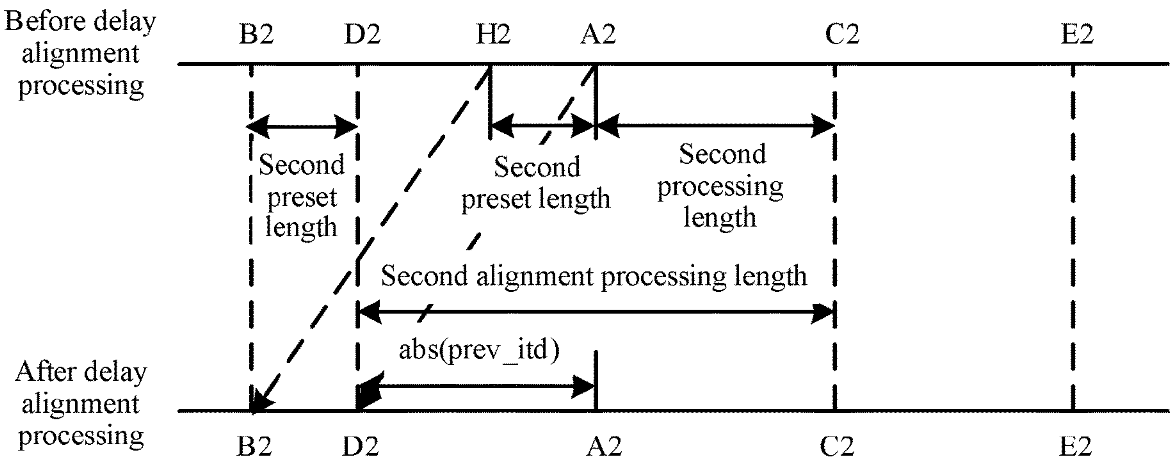
FIG. 6 is a schematic diagram of a stereo signal processing method according to an embodiment of this application.

FIG. 6 is a schematic diagram of stereo signal processing according to an embodiment of this application. In FIG. 6, for ease of description, a point in the second-channel signal before delay alignment processing and a point in the second-channel signal after stretching processing that are at a same location are marked using a same coordinate, but this does not mean that signals at points with a same coordinate are the same.

With reference to FIG. 6, the frame length of the current frame is N, a start point of the second-channel signal of the current frame is B2=0, and an end point of the second-channel signal of the current frame is E2=N−1. The start point of the second alignment processing length is located after the start point B2 of the second-channel signal of the current frame, and a length between the start point D2 of the signal of the second alignment processing length and the end point E2 of the second-channel signal of the current frame is greater than or equal to the second alignment processing length. An end point of the signal of the second alignment processing length is C2=D2+L_pre_target−1. For ease of description, a length between the start point D2 of the signal of the second alignment processing length and the start point B2 of the second-channel signal is referred to as a second preset length in the following. The second preset length may be greater than 0 and less than or equal to a difference value between the frame length of the current frame and the second alignment processing length, and may be set based on an actual situation. Details are not described herein.

A start point A2 of the signal of the second processing length is located after the start point B2 of the second alignment processing length, and a length between the start point A2 of the signal of the second processing length and the start point B2 of the second alignment processing length is the absolute value of the inter-channel time difference of the previous frame. The start point of the signal of the second processing length is A2=D2+abs(prev_itd), and a coordinate of an end point of the signal of the second processing length is the same as a coordinate of the end point of the signal of the second alignment processing length, that is, C2=D2+L_pre_target−1.

In a process of delay alignment processing, a signal of the second preset length that starts from H2=B2+abs(prev_itd) in the second-channel signal is directly used as a signal of the second preset length that starts from the start point B2 in the second-channel signal after stretching processing. That is, with reference to FIG. 6, a signal from point H2 to point A2-1 in the second-channel signal of the current frame is directly used as a signal from point B2 to point D2-1 in the second-channel signal after stretching processing.

In addition, a signal from point A2 to point C2 in the second-channel signal is stretched into a signal of the second alignment processing length, and a stretched signal of the second alignment processing length is used as a signal of the second alignment processing length that starts from point D2 in the second-channel signal after stretching processing. That is, the stretched signal of the second alignment processing length is used as a signal from point D2 to point C2 in the second-channel signal after stretching processing.

In this embodiment of this application, during signal stretching, an unstretched signal in the second-channel signal of the current frame may remain unchanged, that is, a signal from point C2+1 to point E2 in the second-channel signal of the current frame is directly used as a signal from point C2+1 to point E2 in the second-channel signal after stretching processing. E2 is the end point of the second-channel signal of the current frame, the frame length of the current frame is N, and E2=N−1.

Finally, in the second-channel signal after stretching processing, N sampling points starting from the start point B2 are used as the second-channel signal of the current frame after delay alignment processing. That is, a start point of the second-channel signal of the current frame after delay alignment processing is B2, and an end point is E2.

For example, with reference to FIG. 6, the first channel of the current frame is a left channel, and the second channel is a right channel. In a process of delay alignment processing, a signal from point H2 to point A2-1 in the right-channel signal of the current frame is directly used as a signal from point B2 to point D2-1 in the right-channel signal after stretching processing. A signal from point A2 to point C2 in the right-channel signal of the current frame is stretched into a signal of the second alignment processing length, and a stretched signal of the second alignment processing length is used as a signal of from point D2 to point C2 in the right-channel signal after stretching processing. Then, a signal from point C2+1 to point E2 in the right-channel signal of the current frame is directly used as a signal from point C2+1 to point E2 in the right-channel signal after stretching processing. Finally, a signal from point B2 to point E2 in the signal obtained after stretching processing is used as the right-channel signal of the current frame after delay alignment processing.

When the first channel of the current frame is a right channel and the second channel is a left channel, refer to the foregoing description. Details are not described herein.

It should be noted that in this embodiment of this application, a method for stretching the signal of the second processing length may be stretching the signal using a cubic spline interpolation method, may be stretching the signal using a quadratic spline interpolation method, may be stretching the signal using a linear interpolation method, or may be stretching the signal using a B-spline interpolation method, such as a quadratic B-spline interpolation method or a cubic B-spline interpolation method. A specific stretching method is not limited in this embodiment of this application, and stretching may be processed using any technology.

In this embodiment of this application, after delay alignment processing is performed, the inter-channel time difference of the current frame may be further quantized and encoded to obtain a code index of the inter-channel time difference of the current frame, and the code index is written into a bitstream. It should be noted that the inter-channel time difference of the current frame may alternatively be quantized and encoded in step 101, or may be quantized and encoded herein. This is not limited in this embodiment of this application.

Further, there may be many methods for writing the code index into the bitstream. This is not limited in this embodiment of this application. For example, after the absolute value of the inter-channel time difference of the current frame is quantized and encoded, a code index of the absolute value of the inter-channel time difference of the current frame is written into a bitstream, and the bitstream is transmitted to a decoder side. In addition, an index of the target channel of the current frame is written into the bitstream as a target channel index, or an index of the reference channel of the current frame is written into the bitstream as a reference channel index, and the bitstream is transmitted to the decoder side.

The left-channel signal of the current frame after delay alignment processing is denoted as $x'_L(n)$, and the right-channel signal of the current frame after delay alignment processing is denoted as $x'_R(n)$, where n is a sampling point sequence number, and n=0, 1, L, N−1. Based on the sign of the inter-channel time difference of the current frame and the sign of the inter-channel time difference of the previous frame, the first-channel signal after delay alignment processing may be the left-channel signal of the current frame after delay alignment processing and is denoted as $x'_L(n)$, or the second-channel signal after delay alignment processing may be the left-channel signal of the current frame after delay alignment processing and is denoted as $x'_L(n)$. Similarly, the first-channel signal after delay alignment processing may be the right-channel signal of the current frame after delay alignment processing and is denoted as $x'_R(n)$, or the second-channel signal after delay alignment processing may be the right-channel signal of the current frame after delay alignment processing and is denoted as $x'_R(n)$.

Finally, the first-channel signal after delay alignment processing and the second-channel signal after delay alignment processing are encoded.

Further, the first-channel signal after delay alignment processing and the second-channel signal after delay alignment processing may be encoded using an existing stereo encoding method, and an encoded bitstream is transmitted to the decoder side. A specific encoding method is not limited in this embodiment of this application.

Optionally, in this embodiment of this application, when the first alignment processing length is not a preset length, the following formula may be met:

$$L\_next\_target = \frac{|cur\_itd| \times L}{|prev\_itd| + |cur\_itd|}, \quad (8)$$

where L_next_target is the first alignment processing length, cur_itd is the inter-channel time difference of the current frame, prev_itd is the inter-channel time difference of the previous frame, and L is a processing length of delay alignment processing. | . . . | means taking an absolute value.

When the second alignment processing length is not a preset length, the following formula may be met:

$$L\_pre\_target = \frac{|prev\_itd| \times L}{|prev\_itd| + |cur\_itd|}, \quad (9)$$

where L_pre_target is the second alignment processing length, cur_itd is the inter-channel time difference of the current frame, prev_itd is the inter-channel time difference of the previous frame, and L is the processing length of delay alignment processing. L is any preset positive integer that is less than or equal to a corresponding frame length N at a current sampling rate and that is greater than a maximum value of an absolute value of an inter-channel time difference. For example, L=290 or L=200. | . . . | means taking an absolute value.

Optionally, in this embodiment of this application, when the processing length of delay alignment processing is not a preset length, the following formula may be met:

$$L = \frac{(|prev\_itd| + |cur\_itd|) \times L\_init}{MAX\_DELAY\_CHANGE}, \quad (10)$$

where L is the processing length of delay alignment processing, MAX_DELAY_CHANGE is a maximum difference value between inter-channel time differences of adjacent frames, and L_init is a preset processing length of delay alignment processing. For example, L_init may be greater than or equal to the maximum difference value between the inter-channel time differences of the adjacent frames and less than or equal to the frame length of the current frame, and for example, is 290 or 200. | . . . | means taking an absolute value.

MAX_DELAY_CHANGE may be a positive integer greater than 0 and less than or equal to $|T_{max}-T_{min}|$, $T_{max}$ corresponds to a maximum value of the inter-channel time difference at a current sampling rate, and $T_{min}$ corresponds to a minimum value of the inter-channel time difference at the current sampling rate. For example, MAX_DELAY_CHANGE is equal to 80, 40, or 20. In an embodiment of this application, MAX_DELAY_CHANGE may be 20.

The following provides description using a specific embodiment.

Step 1: Perform delay estimation based on a stereo signal of a current frame to determine an inter-channel time difference of the current frame.

For specific content of this step, refer to step 101. Details are not described herein again.

Step 2: If a sign of the inter-channel time difference of the current frame is different from a sign of an inter-channel time difference of a previous frame, perform delay alignment processing on a first-channel signal of the current frame based on the inter-channel time difference of the current frame.

Step 3: If the sign of the inter-channel time difference of the current frame is different from the sign of the inter-channel time difference of the previous frame, perform delay alignment processing on a second-channel signal of the current frame based on the inter-channel time difference of the previous frame.

With reference to step 2 and step 3, a length between the start point of the signal of the second alignment processing length and the start point of the second-channel signal of the current frame is equal to a second preset length, and a length between the start point of the signal of the first alignment processing length and the start point of the first-channel signal of the current frame is equal to a sum of the second preset length and the second alignment processing length. In addition, the first alignment processing length meets Formula (8), and the second alignment processing length meets Formula (9).

Figure 7A:
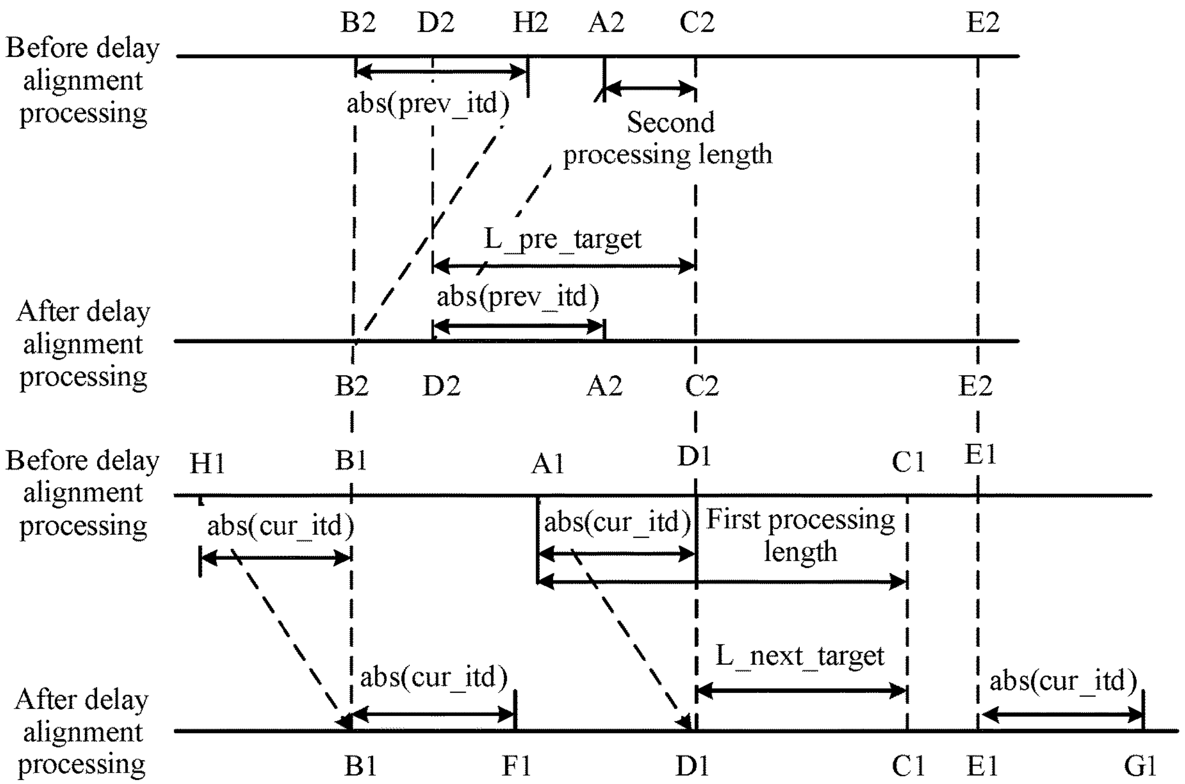
FIG. 7A is a schematic diagram of a stereo signal processing method according to an embodiment of this application.

FIG. 7A is a schematic diagram of stereo signal processing according to an embodiment of this application. In FIG. 7A, for ease of description, a point in the first-channel signal before delay alignment processing and a point in the first-channel signal after delay alignment processing that are at a same location are marked using a same coordinate, and a point in the second-channel signal before delay alignment processing and a point in the second-channel signal after delay alignment processing that are at a same location are marked using a same coordinate.

The frame length of the current frame is N, a start point of the first-channel signal of the current frame is B1=0, an end point of the first-channel signal of the current frame is E1=N−1, a start point of the second-channel signal of the current frame is B2=0, and an end point of the second-channel signal of the current frame is E2=N−1. A start point of the signal of the first alignment processing length is D1=D2+L_pre_target, an end point of the signal of the first alignment processing length is C1=D1+L_next_target−1, a start point of the signal of the first processing length is A1=D1−abs(cur_itd), and a coordinate of an end point of the signal of the first processing length is the same as a coordinate of the end point of the signal of the first alignment processing length, that is, C1=D1+L_next_target−1. The start point of the second alignment processing length is D2, and an end point of the second alignment processing length is C2=D2+L_pre_target−1. The start point of the signal of the second processing length is A2=D2+abs(prev_itd), and an end point of the signal of the second processing length is C2=D2+L_pre_target−1. For ease of description, a length between the start point D2 of the signal of the second alignment processing length and the start point B2 of the second-channel signal is referred to as a second preset length in the following. The second preset length may be greater than 0 and less than or equal to a difference value between the frame length of the current frame and the second alignment processing length, and may be set based on an actual situation. Details are not described herein. In this case, the signal of the first processing length is compressed and the signal of the second processing length is stretched as shown in FIG. 7A.

With reference to FIG. 7A, in a process of performing delay alignment processing on the first-channel signal, a signal from point H1 to point A1-1 in the first-channel signal is directly used as a signal from point B1 to point D1-1 in the first-channel signal after compression processing, where H1=B1−abs(cur_itd). A signal from point A1 to point C1 in the first-channel signal of the current frame is compressed into a signal of the first alignment processing length, and a compressed signal of the first alignment processing length is used as a signal from point D1 to point C1 in the first-channel signal after compression processing. Then, a signal from point C1+1 to point E1 in the first-channel signal of the current frame is directly used as a signal from point C1+1 to point E1 in the first-channel signal after compression processing. Then, a signal of the first delay length is manually reconstructed based on a signal of the first delay length before the end point E2 in the second-channel signal of the current frame, and a reconstructed signal of the first delay length is used as a signal from point E1+1 to point G1 in the first-channel signal after compression processing, where G1=E1+abs(cur_itd)−1. Finally, a signal from point F1 to point G1 in the signal obtained after delay alignment processing is used as the first-channel signal of the current frame after delay alignment processing, and F1=B1+abs (cur_itd).

In a process of performing delay alignment processing on the second-channel signal, a signal of the second preset length that starts from H2=B2+abs(prev_itd) in the second-channel signal is directly used as a signal of the second preset length that starts from the start point B2 in the second-channel signal after stretching processing. That is, with reference to FIG. 7A, a signal from point H2 to point A2-1 in the second-channel signal of the current frame is directly used as a signal from point B2 to point D2-1 in the second-channel signal after stretching processing. A signal from point A2 to point C2 in the second-channel signal of the current frame is stretched into a signal of the second alignment processing length, and a stretched signal of the second alignment processing length is used as a signal from point D2 to point C2 in the second-channel signal after stretching processing. Then, a signal from point C2+1 to point E2 in the second-channel signal of the current frame is directly used as a signal from point C2+1 to point E2 in the second-channel signal after stretching processing. Finally, a signal from point B2 to point E2 in the signal obtained after delay alignment processing is used as the second-channel signal of the current frame after delay alignment processing.

With reference to FIG. 7A, in this embodiment of this application, the start point of the second alignment processing length may also be the start point of the second-channel signal, that is, D2=B2 and D1=B1+L_pre_target. In this case, the signal of the first processing length is compressed, and the signal of the second processing length is stretched as shown in FIG. 7B.

Figure 7B:
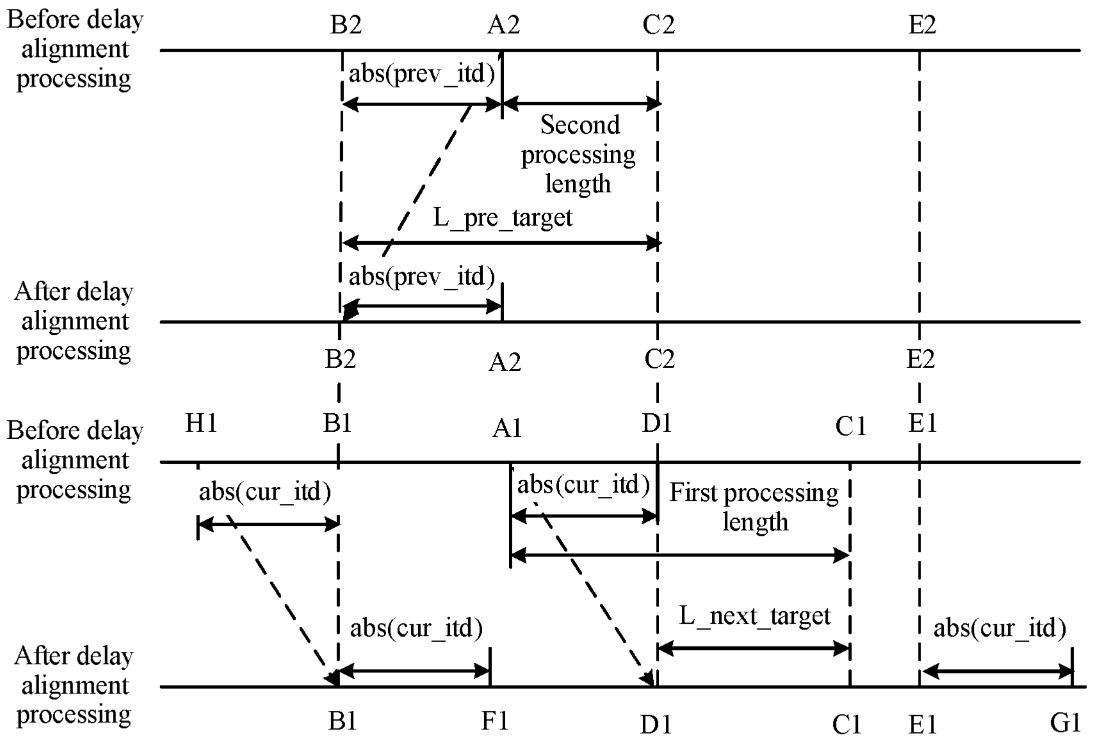
FIG. 7B is a schematic diagram of a stereo signal processing method according to an embodiment of this application.

FIG. 7B is a schematic diagram of stereo signal processing according to an embodiment of this application. In FIG. 7B, for ease of description, a point in the first-channel signal before delay alignment processing and a point in the first-channel signal after delay alignment processing that are at a same location are marked using a same coordinate, and a point in the second-channel signal before delay alignment processing and a point in the second-channel signal after delay alignment processing that are at a same location are marked using a same coordinate.

In FIG. 7B, the frame length of the current frame is N, a start point of the first-channel signal of the current frame is B1=0, and an end point of the first-channel signal of the current frame is E1=N−1. The start point of the signal of the first alignment processing length is D1=B1+L_pre_target, an end point of the signal of the first alignment processing length is C1=B1+L_pre_target+L_next_target−1, the start point of the signal of the first processing length is A1=B1+L_pre_target-abs(cur_itd), and a coordinate of an end point of the signal of the first processing length is the same as a coordinate of the end point of the signal of the first alignment processing length, that is, C1=B1+L_pre_target+L_next_target−1.

A start point of the second-channel signal of the current frame is B2=0, and an end point of the second-channel signal of the current frame is E2=N−1. The start point of the second alignment processing length is the start point B2 of the second-channel signal, and an end point of the second alignment processing length is C2=B2+L_pre_target−1. The start point of the signal of the second processing length is A2=B2+abs(prev_itd), and an end point of the signal of the second processing length is C2=B2+L_pre_target−1.

With reference to FIG. 7B, in a process of performing delay alignment processing on the first-channel signal, a signal from point H1 to point A1-1 in the first-channel signal is directly used as a signal from point B1 to point D1-1 in the first-channel signal after compression processing, where H1=B1−abs(cur_itd). A signal from point A1 to point C1 in the first-channel signal of the current frame is compressed into a signal of the first alignment processing length, and a compressed signal of the first alignment processing length is used as a signal from point D1 to point C1 in the first-channel signal after compression processing. Then, a signal from point C1+1 to point E1 in the first-channel signal of the current frame is directly used as a signal from point C1+1 to point E1 in the first-channel signal after compression processing. Then, a signal of the first delay length is manually reconstructed based on a signal of the first delay length before the end point E2 in the second-channel signal of the current frame, and a reconstructed signal of the first delay length is used as a signal from point E1+1 to point G1 in the first-channel signal after compression processing, where G1=E1+abs(cur_itd)−1. Finally, a signal from point F1 to point G1 in the signal obtained after delay alignment processing is used as the first-channel signal of the current frame after delay alignment processing, and F1=B1+abs (cur_itd).

In a process of performing delay alignment processing on the second-channel signal, a signal from point A2 to point C2 in the second-channel signal of the current frame is stretched into a signal of the second alignment processing length, and a stretched signal of the second alignment processing length is used as a signal from point B2 to point C2 in the second-channel signal after stretching processing.

Then, a signal from point C2+1 to point E2 in the second-channel signal of the current frame is directly used as a signal from point C2+1 to point E2 in the second-channel signal after stretching processing. Finally, a signal from point B2 to point E2 in the signal obtained after delay alignment processing is used as the second-channel signal of the current frame after delay alignment processing.

To add smoothing between frames, a transition section may also be set, and a transition section length is ts. Optionally, a length of a smooth transition section may be further set, and the length of the smooth transition section is Ts2. For a specific method, refer to the foregoing description. Details are not described herein.

In this embodiment of this application, if a sign of an inter-channel time difference of a current frame is the same as a sign of an inter-channel time difference of a previous frame, delay alignment processing may be performed on a signal of a target channel of the current frame based on the inter-channel time difference of the current frame and the inter-channel time difference of the previous frame. In this case, the target channel of the current frame and a target channel of the previous frame are a same channel. A specific delay alignment processing method is not limited in this embodiment of this application.

For example, a possible processing method is as follows.

Step 1: Use an estimated inter-channel time difference of the current frame as the inter-channel time difference of the current frame.

Step 2: Select the target channel and a reference channel of the current frame based on the inter-channel time difference of the current frame and the inter-channel time difference of the previous frame. The inter-channel time difference of the current frame is denoted as cur_itd, and the inter-channel time difference of the previous frame is denoted as prev_itd. Further, if cur_itd=0, the target channel of the current frame is consistent with the target channel of the previous frame. For example, a target channel index of the current frame is denoted as target_idx, a target channel index of the previous frame is denoted as prev_target_idx, and target_idx=prev_target_idx. If cur_itd<0, the target channel of the current frame is a left channel. For example, the target channel index of the current frame is denoted as target_idx, and target_idx=0. If cur_itd>0, the target channel of the current frame is a right channel. For example, the target channel index of the current frame is denoted as target_idx, and target_idx=1.

In addition, the target channel index of the current frame may further be encoded and written into a bitstream, and the bitstream is transmitted to a decoder side.

Step 3: Perform delay alignment processing on a signal of a selected target channel based on the inter-channel time difference of the current frame and the inter-channel time difference of the previous frame. Further, this step may be as follows.

A preprocessed time-domain signal of the channel corresponding to the target channel is used as the signal of the target channel, and a preprocessed time-domain signal of the channel corresponding to the reference channel is used as a signal of the reference channel. For example, if the target channel is a left channel, a preprocessed time-domain signal of the left channel is used as the signal of the target channel, and if the reference channel is a right channel, a preprocessed time-domain signal of the right channel is used as the signal of the reference channel. If the target channel is the right channel, the preprocessed time-domain signal of the right channel is used as the signal of the target channel, and if the reference channel is the left channel, the preprocessed time-domain signal of the left channel is used as the signal of the reference channel.

If abs(cur_itd) is equal to abs(prev_itd), the signal of the target channel is not to be compressed or stretched. An abs(cur_itd)-point signal is manually reconstructed based on the reference-channel signal, and is used as a signal from point B+N to point B+N+abs(cur_itd)−1 of the target-channel signal of the current frame. The target-channel signal of the current frame is directly delayed by abs (cur_itd) sampling points, and is used as the target-channel signal of the current frame after delay alignment processing. B represents a coordinate of a start point in the target-channel signal of the current frame, N represents a frame length of the current frame, and abs( ) represents an absolute value taking operation. The reference-channel signal of the current frame is directly used as the reference-channel signal of the current frame after delay alignment processing.

If abs(cur_itd) is less than abs(prev_itd), a signal from point B+abs(prev_itd)−abs(cur_itd) to point B+L−1 of a buffered target-channel signal is stretched into a signal of a length of L points, which is used as a signal of the first L points of the target channel signal after stretching processing. A signal from point B+L to point B+N−1 in the target-channel signal is directly used as a signal from point B+L to point B+N−1 in the target-channel signal after stretching processing. An abs(cur_itd)−point signal is manually reconstructed based on the reference-channel signal and is used as a signal from point B+N to point B+N+abs (cur_itd)−1 of the target channel signal after stretching processing. An N-point signal starting from point B+abs (cur_itd) in the target-channel signal after stretching processing is used as the target-channel signal of the current frame after delay alignment processing. The reference-channel signal of the current frame is directly used as the reference-channel signal of the current frame after delay alignment processing. B represents a coordinate of a start point in the target-channel signal of the current frame, N represents the frame length of the current frame, and L represents a processing length of delay alignment processing.

If abs(cur_itd) is greater than abs(prev_itd), a signal from point B+abs(prev_itd)−abs(cur_itd) to point B+L−1 of a buffered target-channel signal is compressed into a signal of a length of L points, which is used as a signal of the first L points of the target channel signal after compression processing. A signal from point B+L to point B+N−1 in the target-channel signal is directly used as a signal from point B+L to point B+N−1 in the target-channel signal after compression processing. An abs(cur_itd)−point signal is manually reconstructed based on the reference-channel signal and is used as a signal from point B+N to point B+N+abs(cur_itd)−1 of the target channel signal after compression processing. An N-point signal starting from point B+abs(cur_itd) in the target channel signal after compression processing is used as the target-channel signal of the current frame after delay alignment processing. The reference-channel signal of the current frame is directly used as the reference-channel signal of the current frame after delay alignment processing. B represents a coordinate of a start point in the target-channel signal of the current frame, N represents the frame length of the current frame, and L represents a processing length of delay alignment processing.

To add smoothing between frames, a transition section may be set herein, and a transition section length is ts. A first transition section length may be set to a preset positive integer, and the preset positive integer may be set based on experience by a person skilled in the art. For example, the first transition section length may alternatively be calculated based on the inter-channel time difference of the current frame. For example, ts=abs(cur_itd)/2. Similarly, to add smoothing between a real signal and a reconstructed signal, a smooth transition section may be further set, and a length of the smooth transition section is Ts2. The length of the smooth transition section may be set to a preset positive integer. For example, Ts2 is set to 10. Then, step 3 that perform delay alignment processing on a signal of a selected target channel based on the inter-channel time difference of the current frame and the inter-channel time difference of the previous frame may be changed as follows.

If abs(cur_itd) is less than abs(prev_itd), a signal from point B−ts+abs(prev_itd)−abs(cur_itd) to point B+L−ts−1 of a buffered target-channel signal is stretched into a signal of a length of L, which is used as a signal from point B−ts to point B+L−ts−1 of the target channel signal after stretching processing. A signal from point B+L−ts to point B+N−Ts2−1 in the target-channel signal is directly used as a signal from point B+L−ts to point B+N−Ts2−1 in the target channel signal after stretching processing. A Ts2-point signal is generated based on the reference-channel signal and the target-channel signal, and is used as a signal from point B+N−Ts2 to point B+N−1 of the target channel signal after stretching processing. An abs(cur_itd)−point signal is manually reconstructed based on the reference-channel signal and is used as a signal from point B+N to point B+N+abs (cur_itd)−1 of the target channel signal after stretching processing. An N-point signal starting from point B+abs (cur_itd) in the target channel signal after stretching processing is used as the target-channel signal of the current frame after delay alignment processing. The reference-channel signal of the current frame is directly used as the reference-channel signal of the current frame after delay alignment processing. B represents a coordinate of a start point in the target-channel signal of the current frame, N represents the frame length of the current frame, and L represents a processing length of delay alignment processing.

If abs(cur_itd) is greater than abs(prev_itd), a signal from point B−ts+abs(prev_itd)−abs(cur_itd) to point B+L−ts−1 of a buffered target-channel signal is compressed into a signal of a length of L points, which is used as a signal from point B−ts to point B+L−ts−1 of the target channel signal after compression processing. A signal from point B+L−ts to point B+N−Ts2−1 in the target-channel signal is directly used as a signal from point B+L−ts to point B+N−Ts2−1 in the target channel signal after compression processing. A Ts2-point signal is generated based on the reference-channel signal and the target-channel signal, and is used as a signal from point B+N-Ts2 to point B+N−1 of the target channel signal after compression processing. An abs(cur_itd)−point signal is manually reconstructed based on the reference-channel signal and is used as a signal from point B+N to point B+N+abs(cur_itd)−1 of the target channel signal after compression processing. An N-point signal starting from point B+abs(cur_itd) in the target channel signal after compression processing is used as the target-channel signal of the current frame after delay alignment processing. The reference-channel signal of the current frame is directly used as the reference-channel signal of the current frame after delay alignment processing. B represents a coordinate of a start point in the target-channel signal of the current frame, N represents the frame length of the current frame, and L represents a processing length of delay alignment processing.

That a Ts2-point signal is generated based on the reference-channel signal and the target-channel signal, and is used as a signal from point B+N−Ts2 to point B+N−1 of the target channel signal after compression or stretching processing may be as follows. The Ts2-point signal is generated based on a signal from point B+N−Ts2 to point B+N−1 of the target channel and a signal from point B+N−abs(cur_itd)−Ts2 to point B+N−abs(cur_itd)−1 of the reference channel, and is used as the signal from point B+N−Ts2 to point B+N−1 of the target channel signal after compression or stretching processing. That an abs(cur_itd)−point signal is manually reconstructed based on the reference-channel signal and is used as a signal from point B+N to point B+N+abs(cur_itd)−1 of the target channel signal after compression or stretching processing may be further as follows. The abs(cur_itd)−point signal is generated based on a signal from point B+N-abs(cur_itd) to point B+N−1 of the reference channel, and is used as the signal from point B+N to point B+N+abs(cur_itd)−1 of the target channel signal after compression or stretching processing.

The left-channel signal of the current frame after delay alignment processing is denoted as $x'_L(n)$, and the right-channel signal of the current frame after delay alignment processing is denoted as $x'_R(n)$, where n is a sampling point sequence number, and n=0, 1, L, N−1. According to the sign of the inter-channel time difference of the current frame, the target-channel signal after delay alignment processing may be the left-channel signal of the current frame after delay alignment processing and is denoted as $x'_L(n)$, or the target-channel signal after delay alignment processing may be the right-channel signal of the current frame after delay alignment processing and is denoted as $x'_R(n)$. Similarly, the reference-channel signal after delay alignment processing may be the left-channel signal of the current frame after delay alignment processing and is denoted as $x'_L(n)$, or the reference-channel signal after delay alignment processing may be the right-channel signal of the current frame after delay alignment processing and is denoted as $x'_R(n)$.

The finally obtained signal after delay alignment processing is used for time-domain downmixing processing, to obtain a primary-channel signal and a secondary-channel signal after time-domain downmixing processing. The primary-channel signal and the secondary-channel signal are separately encoded, to encode an input stereo signal.

The embodiment of this application may be further applicable to a decoding process, and the decoding process may be considered as an inverse process of the encoding process, and is described in detail in the following.

Figure 8:
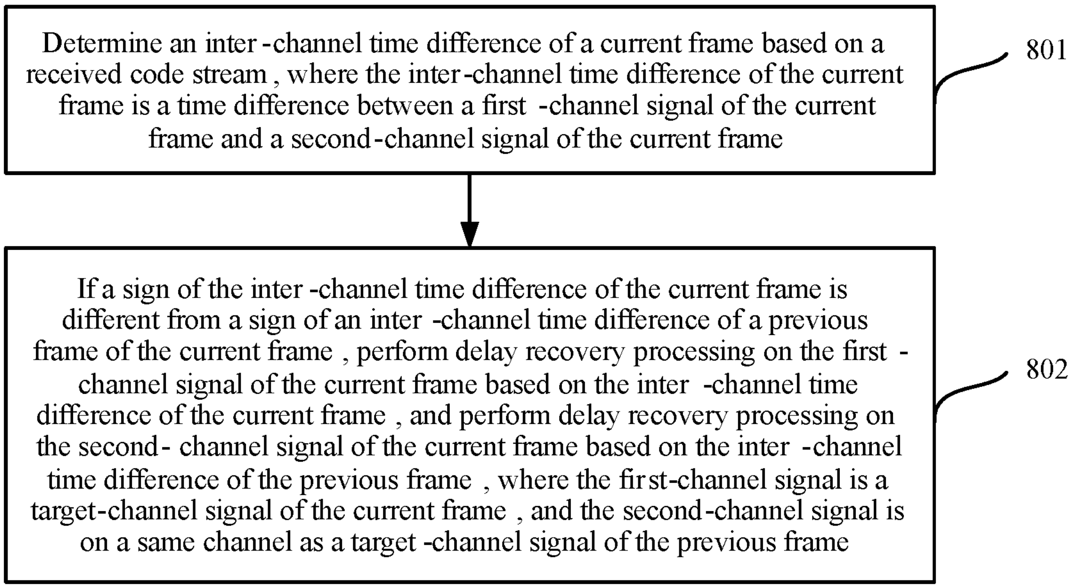
FIG. 8 is a schematic diagram of a stereo signal processing method according to an embodiment of this application.

FIG. 8 shows a stereo signal processing method according to an embodiment of this application, including.

Step 801: Determine an inter-channel time difference of a current frame based on a received bitstream, where the inter-channel time difference of the current frame is a time difference between a first-channel signal of the current frame and a second-channel signal of the current frame.

In step 801, the first-channel signal of the current frame and the second-channel signal of the current frame may be further obtained through decoding based on the received bitstream.

This embodiment of this application sets no limitation on a method for decoding the first-channel signal of the current frame and the second-channel signal of the current frame, provided that the method corresponds to an encoding method for encoding a first-channel signal after delay alignment processing and a second-channel signal after delay alignment processing by an encoder side. The decoded first-channel signal of the current frame, namely, a first-channel signal before delay recovery processing corresponds to an encoded first-channel signal after delay alignment processing on the encoder side. The decoded second-channel signal of the current frame, namely, a second-channel signal before delay recovery processing corresponds to an encoded second-channel signal after delay alignment processing on the encoder side.

In step 801, a method for decoding the inter-channel time difference of the current frame needs to correspond to an encoding method on the encoder side. For example, if the encoder side writes a code index of an absolute value of the inter-channel time difference of the current frame and a reference channel index into a bitstream, and transmits the bitstream to a decoder side, the decoder side decodes the absolute value of the inter-channel time difference of the current frame and the reference channel index based on the received bitstream.

Alternatively, if the encoder side writes a code index of an absolute value of the inter-channel time difference of the current frame and a target channel index into the bitstream, and transmits the bitstream to a decoder side, the decoder side decodes the absolute value of the inter-channel time difference of the current frame and the target channel index based on the received bitstream.

Alternatively, if the encoder side writes a code index of the inter-channel time difference of the current frame into a bitstream and transmits the bitstream to a decoder side, the decoder side decodes the inter-channel time difference of the current frame based on the received bitstream.

For a manner of determining an inter-channel time difference of a previous frame, refer to the description herein. Details are not further described.

Step 802: If a sign of the inter-channel time difference of the current frame is different from a sign of an inter-channel time difference of a previous frame of the current frame, perform delay recovery processing on the first-channel signal of the current frame based on the inter-channel time difference of the current frame, and perform delay recovery processing on the second-channel signal of the current frame based on the inter-channel time difference of the previous frame, where the first-channel signal is a target-channel signal of the current frame, and the second-channel signal is on a same channel as a target-channel signal of the previous frame.

In step 802, the sign may refer to a positive sign (+) or a negative sign (−). In this embodiment of this application, the previous frame is located before the current frame, and is adjacent to the current frame. For ease of description in the following, a channel corresponding to the first-channel signal of the current frame is referred to as a first channel, and a channel corresponding to the second-channel signal of the current frame is referred to as a second channel. It should be noted that the first channel is a target channel of the current frame, and may further be referred to as a next-frame target channel, or may be referred to as an indication target channel of the current frame, or may be referred to as another channel other than a target channel of the previous frame of the current frame. Correspondingly, the second channel is a reference channel of the current frame, and the second channel is a channel that is in the two channels of the stereo signal and that is the same as the target channel of the previous frame, and may further be referred to as a previous-frame target channel, or may be referred to as an indication reference channel of the current frame, or may be referred to as a channel other than the target channel of the current frame. For example, if the target channel of the previous frame is a left channel, the first-channel signal is a right-channel signal in the current frame, and the second-channel signal is a left-channel signal in the current frame. If the target channel of the previous frame is a right channel, the first-channel signal is a left-channel signal in the current frame, and the second-channel signal is a right-channel signal in the current frame.

In step 802, if the decoder side decodes the inter-channel time difference of the current frame based on the received bitstream, the decoder side may directly determine whether the sign of the inter-channel time difference of the current frame is the same as the sign of the inter-channel time difference of the previous frame.

If the decoder side decodes the absolute value of the inter-channel time difference of the current frame and the reference channel of the current frame or the absolute value of the inter-channel time difference of the current frame and the target channel index of the current frame based on the received bitstream, the decoder side needs to determine, based on the reference channel of the current frame and the reference channel index of the previous frame or based on the target channel of the current frame and the reference channel index of the previous frame, whether the sign of the inter-channel time difference of the current frame is the same as the sign of the inter-channel time difference of the previous frame.

Herein, that the absolute value of the inter-channel time difference of the current frame and the reference channel index are decoded is used as an example. Further, if the reference channel index of the current frame is not equal to the reference channel index of the previous frame, it is determined that the sign of the inter-channel time difference of the current frame is different from the sign of the inter-channel time difference of the previous frame. If the reference channel index of the current frame is equal to the reference channel index of the previous frame, it is determined that the sign of the inter-channel time difference of the current frame is the same as the sign of the inter-channel time difference of the previous frame. For another case, refer to the description herein. Details are not further described.

Delay recovery processing on the decoder side corresponds to delay alignment processing on the encoder side. If the encoder side performs compression, the decoder side needs to stretch a compressed signal. Similarly, if the encoder side performs stretching, the decoder side needs to compress a stretched signal.

In this embodiment of this application, in a decoding process, there are a plurality of methods for performing delay recovery processing on the first-channel signal and the second-channel signal, which are separately described in the following.

1. Perform delay recovery processing on the first-channel signal of the current frame based on the inter-channel time difference of the current frame Further, a signal of a third processing length in the first-channel signal of the current frame is stretched into a signal of a third alignment processing length, to obtain the first-channel signal of the current frame after delay recovery processing. The third processing length is determined based on the inter-channel time difference of the current frame and the third alignment processing length, and the third processing length is less than the third alignment processing length.

In the decoding process, the third processing length may be a difference between the third alignment processing length and the absolute value of the inter-channel time difference of the current frame, and the third alignment processing length may be a preset length, or may be determined in another manner, for example, may be determined according to Formula (8). In this embodiment of this application, the third alignment processing length is less than or equal to a frame length of the current frame. When the third alignment processing length is preset, the third alignment processing length may be L, L/2, L/3, or any length less than or equal to L. L is any preset positive integer that is less than or equal to a corresponding frame length N at a current sampling rate and that is greater than a maximum value of an absolute value of an inter-channel time difference. For example, L=290 or L=200. In this embodiment of this application, L may be set to different values for different sampling rates, or may be a uniform value. Generally, a value may be preset based on experience of a skilled person. For example, when a sampling rate is 16 KHz, L is set to 290. In this case, the third alignment processing length is L/2=145.

In this embodiment of this application, a start point of the signal of the third processing length is located after a start point of the signal of the third alignment processing length, and a length between the start point of the signal of the third processing length and the start point of the signal of the third alignment processing length is the absolute value of the inter-channel time difference of the current frame.

In this embodiment of this application, the third alignment processing length may be represented by L2_next_target, and a fourth alignment processing length may be represented by L2_pre_target. It should be noted that the first alignment processing length of the encoder side is actually equal to the third alignment processing length of the decoder side corresponding to the encoder side. Correspondingly, a second alignment processing length of the encoder side is actually equal to the fourth alignment processing length of the decoder side corresponding to the encoder side. For ease of description, different marks are used herein to represent the lengths. The inter-channel time difference of the current frame is cur_itd, and abs(cur_itd) represents the absolute value of the inter-channel time difference of the current frame. For ease of description, abs(cur_itd) is referred to as a first delay length in the following description. The inter-channel time difference of the previous frame is prev_itd, and abs(prev_itd) represents an absolute value of the inter-channel time difference of the previous frame. For ease of description, abs(prev_itd) is referred to as a second delay length in the following description.

In the decoding process, a specific location of the signal of the third processing length may be determined based on different actual conditions, which are separately described in the following.

First possible case is as follows.

Figure 9:
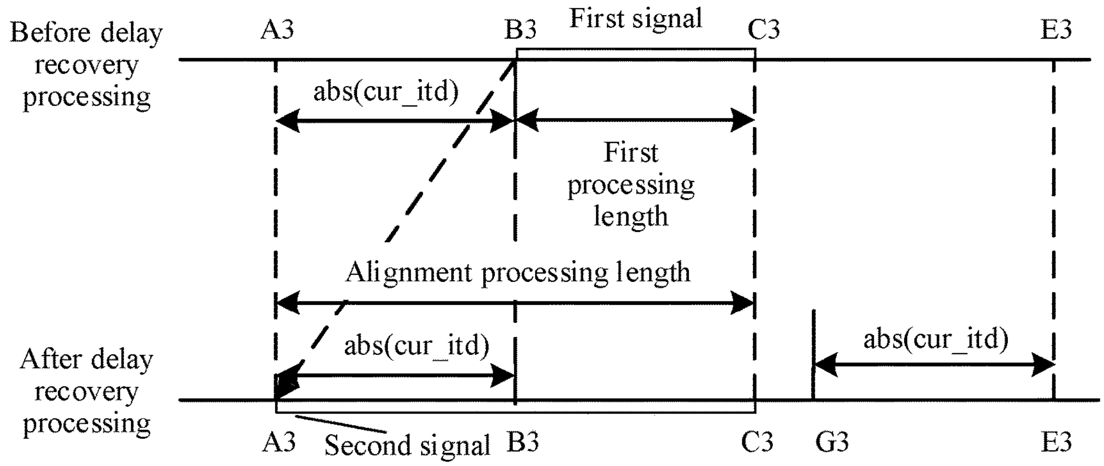
FIG. 9 is a schematic diagram of a stereo signal processing method according to an embodiment of this application.

FIG. 9 is a schematic diagram of stereo signal processing according to an embodiment of this application. In FIG. 9, for ease of description, a point in a first-channel signal before delay recovery processing and a point in a first-channel signal after stretching processing that are at a same location are marked using a same coordinate, but this does not mean that signals at points with a same coordinate are the same.

In FIG. 9, the frame length of the current frame is N, a start point of the first-channel signal of the current frame is B3=0, and an end point of the first-channel signal of the current frame is E3=N−1. The start point of the signal of the third processing length is located at the start point B3 of the first-channel signal of the current frame, and an end point of the signal of the third processing length is C3=B3−abs(cur_itd)+L2_next_target−1.

In FIG. 9, the start point of the third alignment processing length is A3=B3-abs(cur_itd), and an end point of the signal of the third processing length is C3, which is the same as the coordinate of the end point of the signal of the third processing length.

In a process of delay recovery processing, with reference to FIG. 9, a signal from point B3 to point C3 in the first-channel signal of the current frame is stretched into a signal of the third alignment processing length, and a stretched signal of the third alignment processing length is used as a signal of the third alignment processing length that starts from the start point A3 of the third alignment processing length in the first-channel signal after stretching processing, that is, is used as a signal from the start point A3 of the third alignment processing length to point C3 in the first-channel signal after stretching processing.

In this embodiment of this application, during signal stretching, a signal from point C3+1 to point E3 in the first-channel signal of the current frame may be directly used as a signal from point C3+1 to point E3 in the first-channel signal after stretching processing.

Finally, in the first-channel signal after stretching processing, N sampling points starting from the start point A3 are used as the first-channel signal of the current frame after delay recovery processing. That is, a start point of the first-channel signal of the current frame after delay recovery processing is point A3, and an end point is point G3, where G3=E3−abs(cur_itd).

Generally, the start point of the signal of the third processing length may alternatively be located after the start point of the first-channel signal. However, when the start point of the signal of the third processing length is located after the start point of the first-channel signal, it needs to be ensured that a length between the start point of the signal of the third processing length and the end point of the first-channel signal of the current frame is greater than or equal to a difference between the third alignment processing length and the absolute value of the inter-channel time difference of the current frame, which is described in detail below.

Second possible case is as follows.

Figure 10:
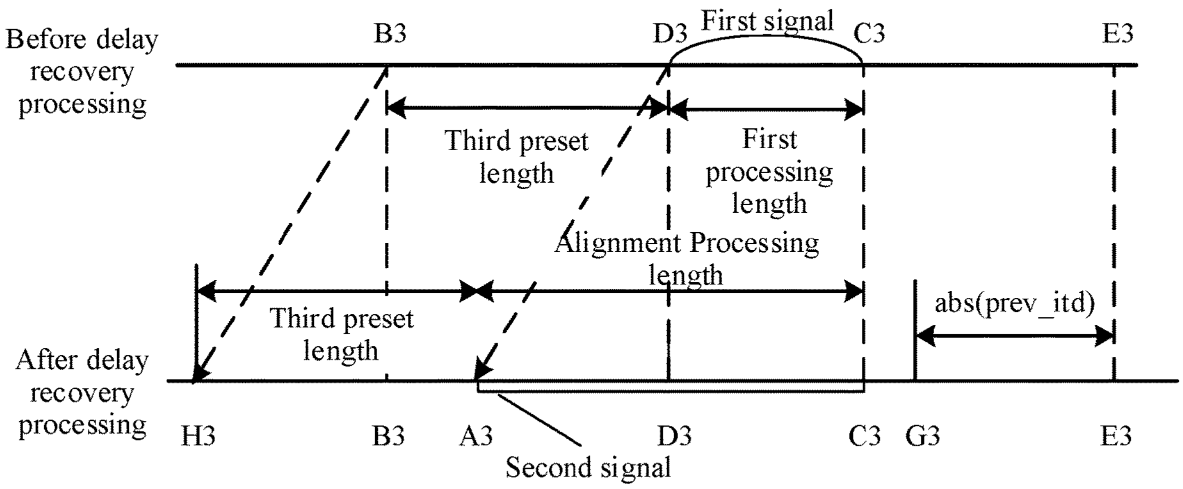
FIG. 10 is a schematic diagram of a stereo signal processing method according to an embodiment of this application.

FIG. 10 is a schematic diagram of stereo signal processing according to an embodiment of this application. In FIG. 10, for ease of description, a point in a first-channel signal before delay recovery processing and a point in a first-channel signal after stretching processing that are at a same location are marked using a same coordinate, but this does not mean that signals at points with a same coordinate are the same.

In FIG. 10, the frame length of the current frame is N, a start point of the first-channel signal of the current frame is B3=0, and an end point of the first-channel signal of the current frame is E3=N−1.

In FIG. 10, the start point of the third processing length is D3, and an end point of the signal of the third processing length is C3=D3−abs(cur_itd)+L2_next_target−1. A3 is the start point of the signal of the third alignment processing length and A3=D3−abs(cur_itd). A coordinate of an end point of the signal of the third alignment processing length is the same as a coordinate of the end point C3 of the signal of the third processing length, that is, C3=A3+L2_next_target-1=D3−abs(cur_itd)+L2_next_target−1. The start point D3 of the signal of the third processing length is located after the start point B3 of the first-channel signal of the current frame, and a length between the start point of the signal of the third processing length and the end point of the first-channel signal of the current frame is greater than or equal to a difference between the third alignment processing length and the absolute value of the inter-channel time difference of the current frame. A length between the start point D3 of the signal of the third processing length and the start point B3 of the first-channel signal of the current frame is a third preset length. The third preset length may be determined based on an actual situation, and the third preset length is greater than 0 and is less than or equal to a difference between the frame length of the current frame and the third processing length. In FIG. 10, that the third preset length is greater than the absolute value of the inter-channel time difference of the current frame is used as an example for description. For another case of the third preset length, refer to the description herein.

In FIG. 10, the length between the start point D3 of the signal of the third processing length and the start point B3 of the first-channel signal of the current frame is the third preset length, and the start point of the signal of the third alignment processing length is A3, where A3=D3−abs(cur_itd). H3 is located before the start point B3 of the first-channel signal of the current frame, a length between H3 and A3 is the third preset length, and a length between H3 and B3 is the absolute value of the inter-channel time difference of the current frame, that is, H3=B3-abs(cur_itd).

It should be noted that point A3 may be located before the start point B3 of the first-channel signal of the current frame, and a length between point A3 and the start point B3 of the first-channel signal of the current frame is less than or equal to the absolute value of the inter-channel time difference of the current frame. Point A3 may be located at the start point B3 of the first-channel signal of the current frame. Point A3 may alternatively be located after the start point B3 of the first-channel signal of the current frame, and a length between point A3 and the start point B3 of the first-channel signal of the current frame is less than or equal to a difference between the frame length of the current frame and the third alignment processing length. For cases of point A3 being at the foregoing locations, refer to the description herein. Details are not further described.

In a process of delay recovery processing, a signal of the third preset length that starts from the start point B3 in the first-channel signal of the current frame may be used as a signal of the third preset length before the start point A3 of the third alignment processing length. With reference to FIG. 10, a signal from point B3 to point D3-1 in the first-channel signal of the current frame is used as a signal from point H3 to point A3-1 in the first-channel signal after delay recovery processing.

Then, a signal of the third processing length that starts from the start point in the first-channel signal of the current frame may be stretched into a signal of the third alignment processing length, and a stretched signal of the third alignment processing length is used as a signal of the third alignment processing length that starts from the start point of the third alignment processing length in the first-channel signal after stretching processing. With reference to FIG. 10, a signal from the start point D3 to point C3 in the first-channel signal of the current frame is stretched into a signal of the third alignment processing length, and is used as a signal from point A3 to point C3 in the first-channel signal after stretching processing.

Then, a signal from point C3+1 to point E3 in the first-channel signal of the current frame is used as a signal from point C3+1 to point E3 in the first-channel signal after stretching processing.

Finally, an N-point signal starting from the start point H3 in the first-channel signal after stretching processing is used as the first-channel signal of the current frame after delay recovery processing. A start point of the first-channel signal of the current frame after delay recovery processing is point H3, and an end point is point G3, where G3=E3−abs (cur_itd).

2. Perform delay recovery processing on the second-channel signal of the current frame based on the inter-channel time difference of the previous frame.

Further, a signal of a fourth processing length in the second-channel signal of the current frame is compressed into a signal of a fourth alignment processing length to obtain the second-channel signal of the current frame after delay recovery processing. The fourth processing length is determined based on the inter-channel time difference of the previous frame and the fourth alignment processing length, and the fourth processing length is greater than the fourth alignment processing length.

In this embodiment of this application, the fourth processing length may be a sum of an absolute value of the inter-channel time difference of the previous frame and the fourth alignment processing length. In addition, a start point of the signal of the fourth processing length is located before a start point of the signal of the fourth alignment processing length, and a length between the start point of the signal of the fourth processing length and the start point of the signal of the fourth alignment processing length is the absolute value of the inter-channel time difference of the previous frame.

It should be noted that the fourth alignment processing length may be a preset length, or may be determined in another manner, for example, is determined according to Formula (9). In this embodiment of this application, when the fourth alignment processing length is less than or equal to the frame length of the current frame, and the fourth alignment processing length is preset, the fourth alignment processing length may be L, L/2, L/3, or any length less than or equal to L.

In this embodiment of this application, the start point of the signal of the fourth alignment processing length may be located at a start point of the second-channel signal of the current frame, or may be located after the start point of the second-channel signal of the current frame. However, regardless of which case, a length between the start point of the signal of the fourth alignment processing length and an end point of the second-channel signal of the current frame is greater than or equal to the fourth alignment processing length, which is separately described in the following.

First possible case is as follows.

Figure 11:
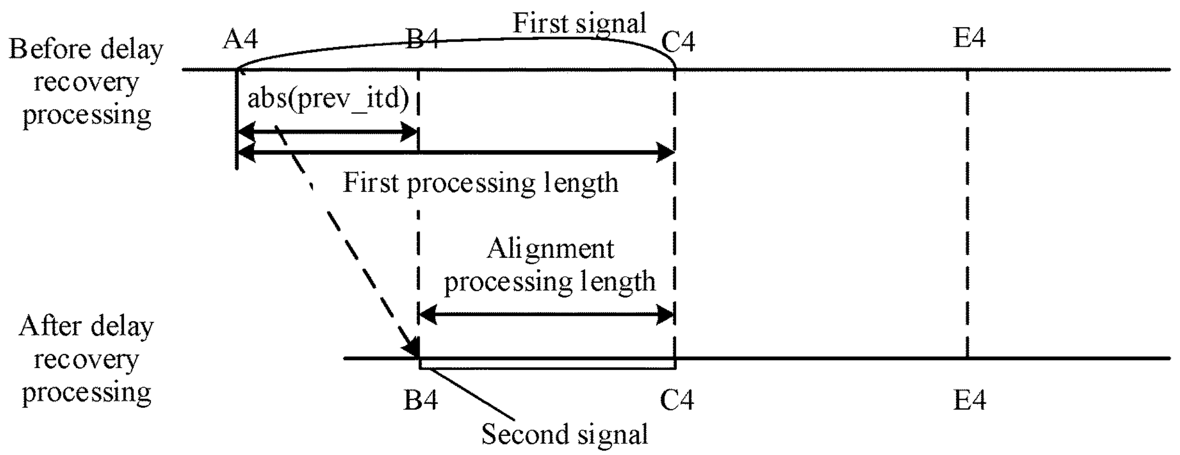
FIG. 11 is a schematic diagram of a stereo signal processing method according to an embodiment of this application.

FIG. 11 is a schematic diagram of stereo signal processing according to an embodiment of this application. In FIG. 11, for ease of description, a point in a second-channel signal before delay recovery processing and a point in a second-channel signal after compression processing that are at a same location are marked using a same coordinate, but this does not mean that signals at points with a same coordinate are the same.

In FIG. 11, the frame length of the current frame is N, the start point of the second-channel signal of the current frame is B4=0, and the end point of the second-channel signal of the current frame is E4=N−1.

The start point of the signal of the fourth alignment processing length is located at the start point B4 of the second-channel signal of the current frame, and an end point of the signal of the fourth alignment processing length is C4=B4+L2_pre_target−1. The start point of the signal of the fourth processing length is A4=B4−abs(prev_itd), and an end point of the signal of the fourth processing length is C4, which is the same as the coordinate of the start point of the signal of the fourth alignment processing length.

In a process of delay recovery processing, a signal of the fourth processing length that starts from the start point of the signal of the fourth processing length may be compressed into a signal of the fourth alignment processing length, and a compressed signal of the fourth alignment processing length is used as a signal of the fourth alignment processing length that starts from point B4 in the second-channel signal after compression processing. With reference to FIG. 11, a signal from point A4 to point C4 is compressed into a signal of the fourth alignment processing length, and a compressed signal of the fourth alignment processing length is used as a signal from point B4 to point C4 in the second-channel signal after compression processing.

Then, a signal from point C4+1 to point E4 in the second-channel signal of the current frame is used as a signal from point C4+1 to point E4 in the second-channel signal after compression processing.

Finally, an N-point signal starting from the start point B4 in the second-channel signal after compression processing is used as the second-channel signal of the current frame after delay recovery processing, that is, a start point of the second-channel signal of the current frame after delay alignment processing is point B4, and an end point is point E4.

Second possible case is as follows.

Figure 12:
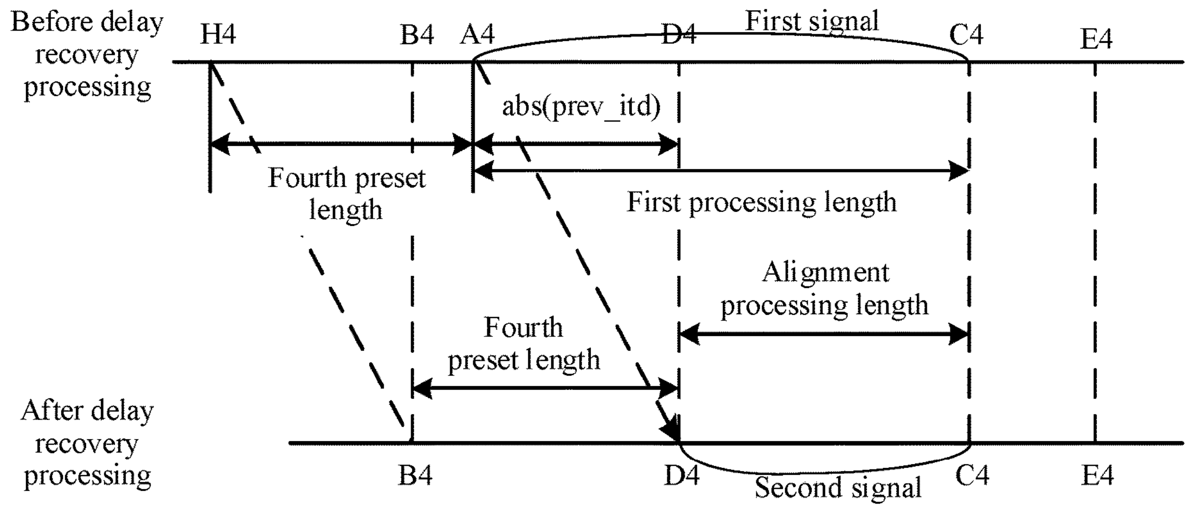
FIG. 12 is a schematic diagram of a stereo signal processing method according to an embodiment of this application.

FIG. 12 is a schematic diagram of stereo signal processing according to an embodiment of this application. In FIG. 12, for ease of description, a point in a second-channel signal of the current frame before delay recovery processing and a point in a second-channel signal of the current frame after compression processing that are at a same location are marked using a same coordinate, but this does not mean that signals at points with a same coordinate are the same.

In FIG. 12, the frame length of the current frame is N, a start point of the first-channel signal of the current frame is B4=0, and an end point of the first-channel signal of the current frame is E4=N−1.

The start point of the signal of the fourth alignment processing length is D4, and an end point of the signal of the fourth alignment processing length is C4=D4+L2_pre_target−1. The start point D4 of the signal of the fourth alignment processing length is located after the start point B4 of the second-channel signal of the current frame, and a length between the start point D4 of the signal of the fourth alignment processing length and the end point E4 of the second-channel signal of the current frame is greater than or equal to the fourth alignment processing length.

For ease of description, a length between the start point D4 of the signal of the fourth alignment processing length and the start point B4 of the second-channel signal of the current frame is a fourth preset length, and the fourth preset length is greater than 0 and is less than or equal to a difference between the frame length of the current frame and the fourth alignment processing length.

The start point of the signal of the fourth processing length is A4=D4−abs(prev_itd), and an end point of the signal of the fourth processing length is C4, which is the same as the coordinate of the start point of the signal of the fourth alignment processing length.

In FIG. 12, a length between point H4 and point A4 is the fourth preset length, and a length between point H4 and point B4 is the absolute value of the inter-channel time difference of the previous frame, that is, H4=B4−abs(prev_itd).

In a process of delay recovery processing, a signal of the fourth preset length before the start point of the signal of the fourth processing length in the second-channel signal of the current frame may be directly used as a signal of the fourth preset length that starts from point B4 in the second-channel signal after compression processing. With reference to FIG. 12, a signal from point H4 to point A4-1 is used as a signal from point B4 to point D4-1 in the second-channel signal after compression processing.

Then, a signal of the fourth processing length that starts from the start point of the signal of the fourth processing length in the second-channel signal of the current frame may be compressed into a signal of the fourth alignment processing length, and a compressed signal of the fourth alignment processing length is used as a signal of the fourth alignment processing length that starts from the start point of the signal of the fourth alignment processing length in the second-channel signal after compression processing. With reference to FIG. 12, a signal from point A4 to point C4 in the second-channel signal of the current frame is compressed into a signal of the fourth alignment processing length, and a compressed signal of the fourth alignment processing length is used as a signal from point D4 to point C4 in the second-channel signal after compression processing.

Then, an uncompressed signal in the second-channel signal of the current frame is kept unchanged, that is, a signal from point C4+1 to point E4 in the second-channel signal of the current frame is used as a signal from point C4+1 to point E4 in the second-channel signal after compression processing.

Finally, an N-point signal starting from the start point B4 in the second-channel signal after compression processing is used as the second-channel signal of the current frame after delay recovery processing.

The following provides description using a specific embodiment.

Step 1: Determine an inter-channel time difference of a current frame based on a received bitstream.

For specific content of this step, refer to step 801. Details are not described herein again.

Step 2: If a sign of the inter-channel time difference of the current frame is different from a sign of an inter-channel time difference of a previous frame, perform delay recovery processing on a first-channel signal of the current frame based on the inter-channel time difference of the current frame.

Step 3: If the sign of the inter-channel time difference of the current frame is different from the sign of the inter-channel time difference of the previous frame, perform delay recovery processing on a second-channel signal of the current frame based on the inter-channel time difference of the previous frame.

Figure 13:
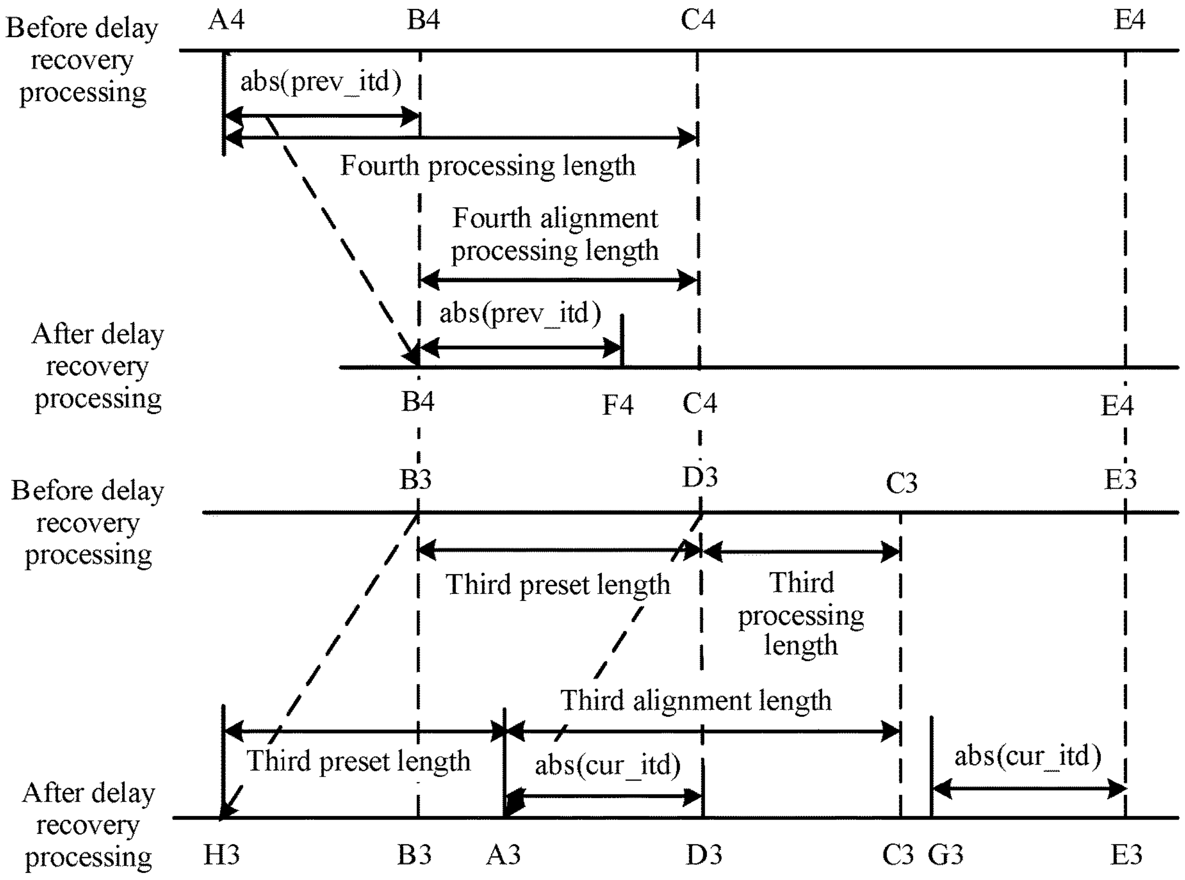
FIG. 13 is a schematic diagram of a stereo signal processing method according to an embodiment of this application.

In step 2 and step 3, a length between the start point of the signal of the fourth alignment processing length and the start point of the second-channel signal of the current frame is equal to a fourth preset length, and a length between the start point of the signal of the third alignment processing length and the start point of the first-channel signal of the current frame is equal to a sum of the fourth preset length and the fourth alignment processing length. In addition, the third alignment processing length meets Formula (8), and the fourth alignment processing length meets Formula (9). In this case, the signal of the third processing length is stretched and the signal of the fourth processing length is compressed as shown in FIG. 13. In FIG. 13, an example in which the start point of the fourth alignment processing length is located at the start point of the first-channel signal of the current frame is used for description. When the start point of the fourth alignment processing length is located at another location, refer to description that delay recovery processing is performed on the second-channel signal when the start point of the fourth alignment processing length is located after the start point B4 of the second-channel signal of the current frame, and description that delay recovery processing is performed on the first-channel signal in this case. Details are not described herein.

In FIG. 13, the frame length of the current frame is N, the start point of the second-channel signal of the current frame is B4=0, and the end point of the second-channel signal of the current frame is E4=N−1. The start point of the signal of the fourth alignment processing length is located at the start point B4 of the second-channel signal of the current frame, and an end point of the signal of the fourth alignment processing length is C4=B4+L2_pre_target−1. The start point of the signal of the fourth processing length is A4=B4−abs(prev_itd), and an end point of the signal of the fourth processing length is C4=B4+L2_pre_target−1.

The start point of the first-channel signal of the current frame is B3=0, and an end point of the first-channel signal of the current frame is E3=N−1. The start point of the signal of the third processing length is D3=B4+L2_pre_target, where D3=C4+1. An end point of the signal of the third processing length is C3=A3+L2_next_target−1, the start point of the signal of the third alignment processing length is A3=D3−abs(cur_itd), and an end point of the signal of the third alignment processing length is C3=A3+L_next_target−1.

In a process of delay recovery processing, for the first-channel signal, a signal from point B3 to point D3-1 in the first-channel signal of the current frame is directly used as a signal from point H3 to point A3-1 in the first-channel signal after stretching processing, and H3=A3-L2_pre_target.

Then, a signal from point D3 to point C3 in the first-channel signal of the current frame is stretched into a signal of the third alignment processing length, and a stretched signal of the third alignment processing length is used as a signal from point A3 to point C3 in the first-channel signal after stretching processing.

Then, a signal from point C3+1 to point E3 in the first-channel signal of the current frame is used as a signal from point C3+1 to point E3 in the first-channel signal after stretching processing.

Finally, an N-point signal starting from the start point A3 in the first-channel signal after stretching processing is used as the first-channel signal of the current frame after delay recovery processing. A start point of the first-channel signal of the current frame after delay recovery processing is point A3, and an end point is point G3, where G3=E3−abs(cur_itd).

In a process of delay recovery processing, for the second-channel signal, a signal from point A4 to point C4 is compressed into a signal of the fourth alignment processing length, and a compressed signal of the fourth alignment processing length is used as a signal from point B4 to point C4 in the second-channel signal after compression processing.

Then, a signal from point C4+1 to point E4 in the second-channel signal of the current frame is used as a signal from point C4+1 to point E4 in the second-channel signal after compression processing.

Finally, an N-point signal starting from the start point B4 in the second-channel signal after compression processing is used as the second-channel signal of the current frame after delay recovery processing, that is, a start point of the second-channel signal of the current frame after delay alignment processing is point B4, and an end point is point E4.

It should be noted that, in this embodiment of this application, a signal stretching or compressing method is not limited. For details, refer to the description in step 101 and step 102. Details are not described herein again.

In this embodiment of this application, when there is a transition section length between frames, refer to the foregoing description. Details are not described herein.

Based on a same technical concept, an embodiment of this application further provides a stereo signal processing apparatus, and the stereo signal processing apparatus may perform the method procedure in FIG. 1.

Figure 14:
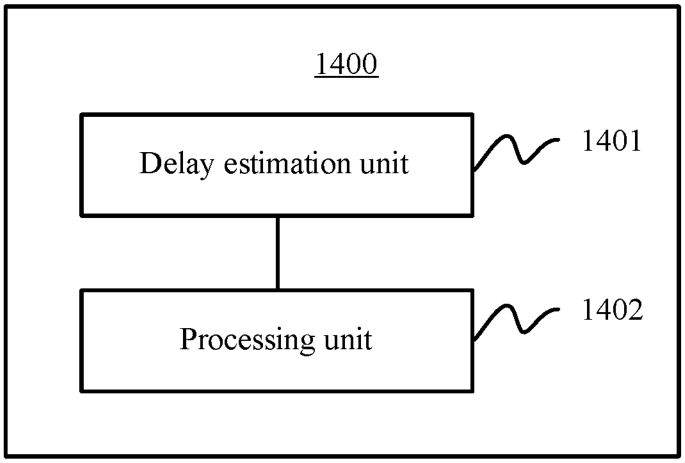
FIG. 14 is a schematic structural diagram of a stereo signal processing apparatus according to an embodiment of this application.

As shown in FIG. 14, an embodiment of this application provides a schematic structural diagram of a stereo signal processing apparatus 1400.

Referring to FIG. 14, the stereo signal processing apparatus 1400 includes a delay estimation unit 1401 configured to perform delay estimation based on a stereo signal of a current frame to determine an inter-channel time difference of the current frame, and a processing unit 1402 configured to if a sign of the inter-channel time difference of the current frame is different from a sign of an inter-channel time difference of a previous frame, perform delay alignment processing on a first-channel signal of the current frame based on the inter-channel time difference of the current frame, and perform delay alignment processing on a second-channel signal of the current frame based on the inter-channel time difference of the previous frame, where the first-channel signal is a target-channel signal of the current frame, and the second-channel signal is a signal that is in the stereo signal of the current frame and that is on a same channel as a target channel signal of the previous frame.

Optionally, the processing unit 1402 is further configured to compress a signal of a first processing length in the first-channel signal of the current frame into a signal of a first alignment processing length to obtain the first-channel signal of the current frame after delay alignment processing, where the first processing length is determined based on the inter-channel time difference of the current frame and the first alignment processing length, and the first processing length is greater than the first alignment processing length.

Optionally, the first processing length is a sum of an absolute value of the inter-channel time difference of the current frame and the first alignment processing length.

Optionally, a start point of the signal of the first processing length is located before a start point of the signal of the first alignment processing length, and a length between the start point of the signal of the first processing length and the start point of the signal of the first alignment processing length is the absolute value of the inter-channel time difference of the current frame.

Optionally, a start point of the signal of the first alignment processing length is located at a start point of the first-channel signal of the current frame or after the start point of the first-channel signal of the current frame, and a length between the start point of the signal of the first alignment processing length and an end point of the first-channel signal of the current frame is greater than or equal to the first alignment processing length.

Optionally, a start point of the signal of the first alignment processing length is located before a start point of the first-channel signal of the current frame, a length between the start point of the signal of the first alignment processing length and the start point of the first-channel signal of the current frame is less than or equal to a transition section length, a length between the start point of the signal of the first alignment processing length and an end point of the first-channel signal of the current frame is greater than or equal to a sum of the first alignment processing length and the transition section length, and the transition section length is less than or equal to the absolute value of the inter-channel time difference of the current frame.

Optionally, the processing unit 1402 is further configured to stretch a signal of a second processing length in the second-channel signal of the current frame into a signal of a second alignment processing length, to obtain the second-channel signal of the current frame after delay alignment processing, where the second processing length is determined based on the inter-channel time difference of the previous frame and the second alignment processing length, and the second processing length is less than the second alignment processing length.

Optionally, the second processing length is a difference between the second alignment processing length and an absolute value of the inter-channel time difference of the previous frame.

Optionally, a start point of the signal of the second processing length is located after a start point of the signal of the second alignment processing length, and a length between the start point of the signal of the second processing length and the start point of the signal of the second alignment processing length is the absolute value of the inter-channel time difference of the previous frame.

Optionally, a start point of the signal of the second alignment processing length is located at a start point of the second-channel signal of the current frame or after the start point of the second-channel signal of the current frame, and a length between the start point of the signal of the second alignment processing length and an end point of the second-channel signal of the current frame is greater than or equal to the second alignment processing length.

Optionally, a length between the start point of the signal of the second alignment processing length and the start point of the second-channel signal of the current frame is equal to a second preset length, and a length between the start point of the signal of the first alignment processing length and the start point of the first-channel signal of the current frame is equal to a sum of the second preset length and the second alignment processing length.

Optionally, the first alignment processing length is less than or equal to a frame length of the current frame, and the first alignment processing length is either a preset length or meets the following formula:

$$\text{L\_next\_target} = \frac{|\text{cur\_itd}| \times L}{|\text{prev\_itd}| + |\text{cur\_itd}|},$$

where L_next_target is the first alignment processing length, cur_itd is the inter-channel time difference of the current frame, prev_itd is the inter-channel time difference of the previous frame, and L is a processing length of delay alignment processing.

Optionally, the second alignment processing length is less than or equal to the frame length of the current frame, and the second alignment processing length is either a preset length or meets the following formula:

$$\text{L\_pre\_target} = \frac{|\text{prev\_itd}| \times L}{|\text{prev\_itd}| + |\text{cur\_itd}|},$$

where L_pre_target is the second alignment processing length, cur_itd is the inter-channel time difference of the current frame, prev_itd is the inter-channel time difference of the previous frame, and L is the processing length of delay alignment processing.

Optionally, the processing length of delay alignment processing is less than or equal to the frame length of the current frame, and the processing length of delay alignment processing is either a preset length or meets the following formula:

$$L = \frac{(|\text{prev\_itd}| + |\text{cur\_itd}|) \times \text{L\_init}}{\text{MAX\_DELAY\_CHANGE}},$$

where L is the processing length of delay alignment processing, MAX_DELAY_CHANGE is a maximum difference value between inter-channel time differences of adjacent frames, and L_init is a preset processing length of delay alignment processing.

Based on a same technical concept, an embodiment of this application further provides a stereo signal processing apparatus, and the stereo signal processing apparatus may perform the method procedure in FIG. 1.

Figure 15:
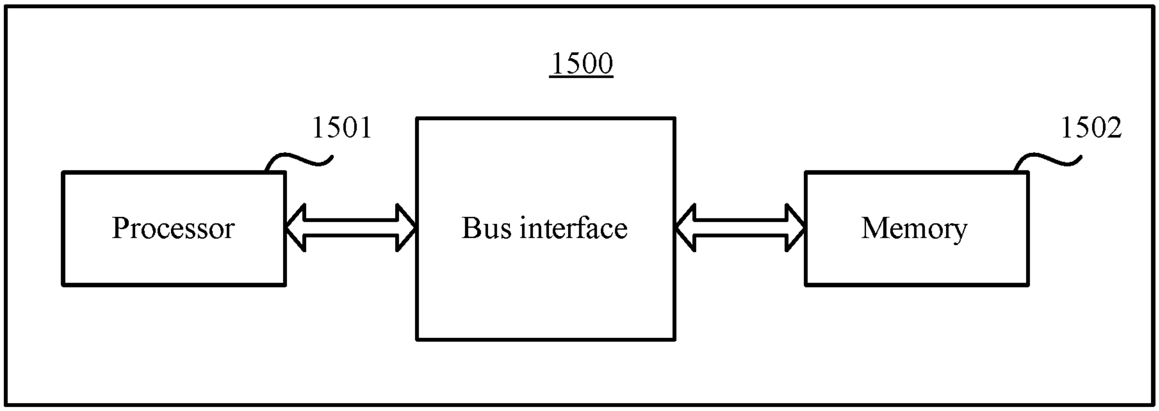
FIG. 15 is a schematic structural diagram of a stereo signal processing apparatus according to an embodiment of this application.

As shown in FIG. 15, an embodiment of this application provides a schematic structural diagram of a stereo signal processing apparatus 1500.

Referring to FIG. 15, the stereo signal processing apparatus 1500 includes a processor 1501 and a memory 1502.

The memory 1502 stores an executable instruction, and the executable instruction is used to instruct the processor 1501 to perform the following steps of performing delay estimation on a stereo signal of a current frame to determine an inter-channel time difference of the current frame, where the inter-channel time difference of the current frame is a time difference between a first-channel signal of the current frame and a second-channel signal of the current frame, and if a sign of the inter-channel time difference of the current frame is different from a sign of an inter-channel time difference of a previous frame of the current frame, performing delay alignment processing on the first-channel signal of the current frame based on the inter-channel time difference of the current frame, and performing delay alignment processing on the second-channel signal of the current frame based on the inter-channel time difference of the previous frame, where the first-channel signal is a target-channel signal of the current frame, and the second-channel signal is on a same channel as a target-channel signal of the previous frame.

Optionally, when performing delay alignment processing on the first-channel signal of the current frame based on the inter-channel time difference of the current frame, the executable instruction is used to instruct the processor 1501 to perform the following steps of compressing a signal of a first processing length in the first-channel signal of the current frame into a signal of a first alignment processing length to obtain the first-channel signal of the current frame after delay alignment processing, where the first processing length is determined based on the inter-channel time difference of the current frame and the first alignment processing length, and the first processing length is greater than the first alignment processing length.

Optionally, the first processing length is a sum of an absolute value of the inter-channel time difference of the current frame and the first alignment processing length.

Optionally, a start point of the signal of the first processing length is located before a start point of the signal of the first alignment processing length, and a length between the start point of the signal of the first processing length and the start point of the signal of the first alignment processing length is the absolute value of the inter-channel time difference of the current frame.

Optionally, a start point of the signal of the first alignment processing length is located at a start point of the first-channel signal of the current frame or after the start point of the first-channel signal of the current frame, and a length between the start point of the signal of the first alignment processing length and an end point of the first-channel signal of the current frame is greater than or equal to the first alignment processing length.

Optionally, a start point of the signal of the first alignment processing length is located before a start point of the first-channel signal of the current frame, a length between the start point of the signal of the first alignment processing length and the start point of the first-channel signal of the current frame is less than or equal to a transition section length, a length between the start point of the signal of the first alignment processing length and an end point of the first-channel signal of the current frame is greater than or equal to a sum of the first alignment processing length and the transition section length, and the transition section length is less than or equal to the absolute value of the inter-channel time difference of the current frame.

Optionally, when performing delay alignment processing on the second-channel signal of the current frame based on the inter-channel time difference of the previous frame, the executable instruction is used to instruct the processor 1501 to perform the following steps of stretching a signal of a second processing length in the second-channel signal of the current frame into a signal of a second alignment processing length to obtain the second-channel signal of the current frame after delay alignment processing, where the second processing length is determined based on the inter-channel time difference of the previous frame and the second alignment processing length, and the second processing length is less than the second alignment processing length.

Optionally, the second processing length is a difference between the second alignment processing length and an absolute value of the inter-channel time difference of the previous frame.

Optionally, a start point of the signal of the second processing length is located after a start point of the signal of the second alignment processing length, and a length between the start point of the signal of the second processing length and the start point of the signal of the second alignment processing length is the absolute value of the inter-channel time difference of the previous frame.

Optionally, a start point of the signal of the second alignment processing length is located at a start point of the second-channel signal of the current frame or after the start point of the second-channel signal of the current frame, and a length between the start point of the signal of the second alignment processing length and an end point of the second-channel signal of the current frame is greater than or equal to the second alignment processing length.

Optionally, a length between the start point of the signal of the second alignment processing length and the start point of the second-channel signal of the current frame is equal to a second preset length, and a length between the start point of the signal of the first alignment processing length and the start point of the first-channel signal of the current frame is equal to a sum of the second preset length and the second alignment processing length.

Optionally, the first alignment processing length is less than or equal to a frame length of the current frame, and the first alignment processing length is either a preset length or meets the following formula:

$$L\_next\_target = \frac{|cur\_itd| \times L}{|prev\_itd| + |cur\_itd|},$$

where L_next_target is the first alignment processing length, cur_itd is the inter-channel time difference of the current frame, prev_itd is the inter-channel time difference of the previous frame, and L is a processing length of delay alignment processing.

Optionally, the second alignment processing length is less than or equal to the frame length of the current frame, and the second alignment processing length is either a preset length or meets the following formula:

$$L\_pre\_target = \frac{|prev\_itd| \times L}{|prev\_itd| + |cur\_itd|},$$

where L_pre_target is the second alignment processing length, cur_itd is the inter-channel time difference of the current frame, prev_itd is the inter-channel time difference of the previous frame, and L is the processing length of delay alignment processing.

Optionally, the processing length of delay alignment processing is less than or equal to the frame length of the current frame, and the processing length of delay alignment processing is either a preset length or meets the following formula:

$$L = \frac{(|prev\_itd| + |cur\_itd|) \times L\_init}{MAX\_DELAY\_CHANGE},$$

where L is the processing length of delay alignment processing, MAX_DELAY_CHANGE is a maximum difference value between inter-channel time differences of adjacent frames, and L_init is a preset processing length of delay alignment processing.

Based on a same technical concept, an embodiment of this application further provides a stereo signal processing apparatus, and the stereo signal processing apparatus may perform the method procedure in FIG. 8.

Figure 16:
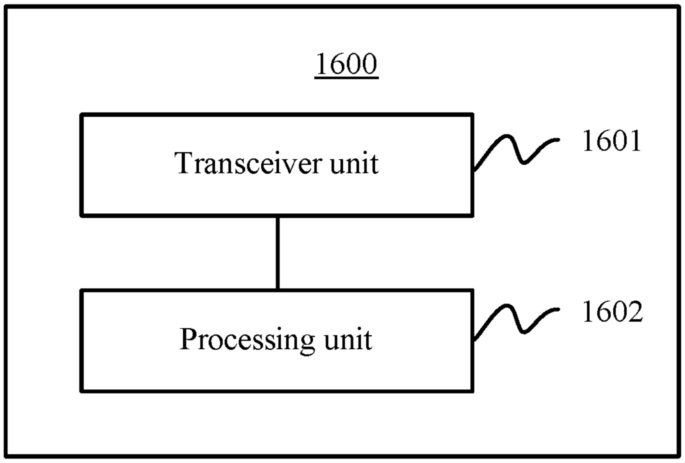
FIG. 16 is a schematic structural diagram of a stereo signal processing apparatus according to an embodiment of this application.

As shown in FIG. 16, an embodiment of this application provides a schematic structural diagram of a stereo signal processing apparatus 1600.

Referring to FIG. 16, the stereo signal processing apparatus 1600 includes a transceiver unit 1601 configured to determine an inter-channel time difference of a current frame based on a received bitstream, and a processing unit 1602 configured to if a sign of the inter-channel time difference of the current frame is different from a sign of an inter-channel time difference of a previous frame, perform delay recovery processing on a first-channel signal of the current frame based on the inter-channel time difference of the current frame, and perform delay recovery processing on a second-channel signal of the current frame based on the inter-channel time difference of the previous frame, where the first-channel signal is a target-channel signal of the current frame, and the second-channel signal is a signal that is in a stereo signal of the current frame and that is on a same channel as a target channel signal of the previous frame.

Optionally, the processing unit 1602 is further configured to stretch a signal of a third processing length in the first-channel signal of the current frame into a signal of a third alignment processing length, to obtain the first-channel signal of the current frame after delay recovery processing, where the third processing length is determined based on the inter-channel time difference of the current frame and the third alignment processing length, and the third processing length is less than the third alignment processing length.

Optionally, the third processing length is a difference between the third alignment processing length and an absolute value of the inter-channel time difference of the current frame.

Optionally, a start point of the signal of the third processing length is located after a start point of the signal of the third alignment processing length, and a length between the start point of the signal of the third processing length and the start point of the signal of the third alignment processing length is the absolute value of the inter-channel time difference of the current frame.

Optionally, the start point of the signal of the third processing length is located at a start point of the first-channel signal of the current frame or after the start point of the first-channel signal of the current frame, and a length between the start point of the signal of the third processing length and an end point of the first-channel signal of the current frame is greater than or equal to the difference between the third alignment processing length and the absolute value of the inter-channel time difference of the current frame.

Optionally, the processing unit 1602 is further configured to compress a signal of a fourth processing length in the second-channel signal of the current frame into a signal of a fourth alignment processing length, to obtain the second-channel signal of the current frame after delay recovery processing, where the fourth processing length is determined based on the inter-channel time difference of the previous frame and the fourth alignment processing length, and the fourth processing length is greater than the fourth alignment processing length.

Optionally, the fourth processing length is a sum of an absolute value of the inter-channel time difference of the previous frame and the fourth alignment processing length.

Optionally, a start point of the signal of the fourth processing length is located before a start point of the signal of the fourth alignment processing length, and a length between the start point of the signal of the fourth processing length and the start point of the signal of the fourth alignment processing length is the absolute value of the inter-channel time difference of the previous frame.

Optionally, the start point of the signal of the fourth alignment processing length is located at a start point of the second-channel signal of the current frame or after the start point of the second-channel signal of the current frame, and a length between the start point of the signal of the fourth alignment processing length and an end point of the second-channel signal of the current frame is greater than or equal to the fourth alignment processing length.

Optionally, a length between the start point of the signal of the fourth alignment processing length and the start point of the second-channel signal of the current frame is equal to a fourth preset length, and a length between the start point of the signal of the third alignment processing length and the start point of the first-channel signal of the current frame is equal to a sum of the fourth preset length and the fourth alignment processing length.

Optionally, the third alignment processing length is less than or equal to a frame length of the current frame, and the third alignment processing length is either a preset length or meets the following formula:

$$\text{L2\_next\_target} = \frac{|\text{cur\_itd}| \times L}{|\text{prev\_itd}| + |\text{cur\_itd}|},$$

where L2_next_target is the third alignment processing length, cur_itd is the inter-channel time difference of the current frame, prev_itd is the inter-channel time difference of the previous frame, and L is a processing length of delay alignment processing.

Optionally, the fourth alignment processing length is less than or equal to the frame length of the current frame, and the fourth alignment processing length is either a preset length or meets the following formula:

$$\text{L2\_pre\_target} = \frac{|\text{prev\_itd}| \times L}{|\text{prev\_itd}| + |\text{cur\_itd}|},$$

where L2_pre_target is the fourth alignment processing length, cur_itd is the inter-channel time difference of the current frame, prev_itd is the inter-channel time difference of the previous frame, and L is the processing length of delay alignment processing.

Optionally, the processing length of delay alignment processing is less than or equal to the frame length of the current frame, and the processing length of delay alignment processing is either a preset length or meets the following formula:

$$L = \frac{(|\text{prev\_itd}| + |\text{cur\_itd}|) \times \text{L\_init}}{\text{MAX\_DELAY\_CHANGE}},$$

where L is the processing length of delay alignment processing, MAX_DELAY_CHANGE is a maximum difference value between inter-channel time differences of adjacent frames, and L_init is a preset processing length of delay alignment processing.

Based on a same technical concept, an embodiment of this application further provides a stereo signal processing apparatus, and the stereo signal processing apparatus may perform the method procedure in FIG. 8.

Figure 17:
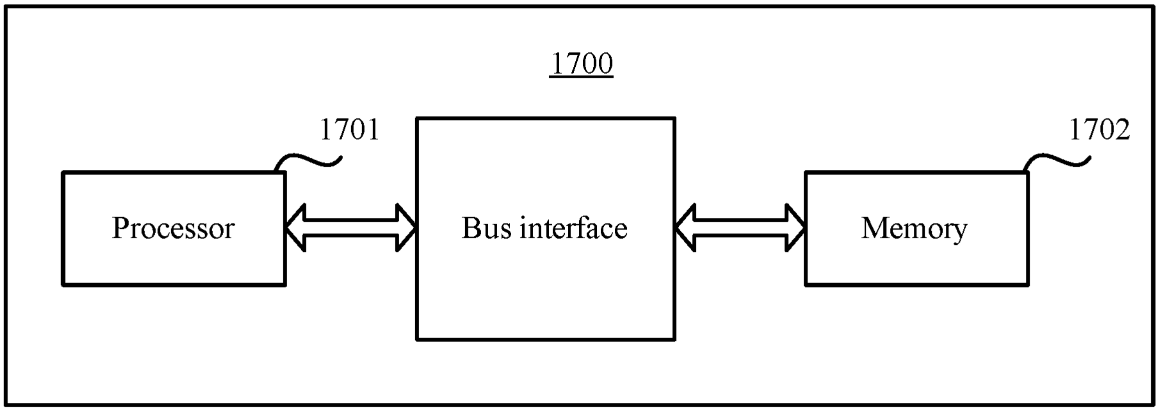
FIG. 17 is a schematic structural diagram of a stereo signal processing apparatus according to an embodiment of this application.

As shown in FIG. 17, an embodiment of this application provides a schematic structural diagram of a stereo signal processing apparatus 1700.

Referring to FIG. 17, the stereo signal processing apparatus 1700 includes a processor 1701 and a memory 1702.

The memory 1702 stores an executable instruction, and the executable instruction is used to instruct the processor 1701 to perform the following steps of determining an inter-channel time difference of a current frame based on a received bitstream, where the inter-channel time difference of the current frame is a time difference between a first-channel signal of the current frame and a second-channel signal of the current frame, and if a sign of the inter-channel time difference of the current frame is different from a sign of an inter-channel time difference of a previous frame of the current frame, performing delay recovery processing on the first-channel signal of the current frame based on the inter-channel time difference of the current frame, and performing delay recovery processing on the second-channel signal of the current frame based on the inter-channel time difference of the previous frame, where the first-channel signal is a target-channel signal of the current frame, and the second-channel signal is on a same channel as a target-channel signal of the previous frame.

Optionally, when performing delay recovery processing on the first-channel signal of the current frame based on the inter-channel time difference of the current frame, the executable instruction is used to instruct the processor 1701 to perform the following steps of stretching a signal of a third processing length in the first-channel signal of the current frame into a signal of a third alignment processing length, to obtain the first-channel signal of the current frame after delay recovery processing, where the third processing length is determined based on the inter-channel time difference of the current frame and the third alignment processing length, and the third processing length is less than the third alignment processing length.

Optionally, the third processing length is a difference between the third alignment processing length and an absolute value of the inter-channel time difference of the current frame.

Optionally, a start point of the signal of the third processing length is located after a start point of the signal of the third alignment processing length, and a length between the start point of the signal of the third processing length and the start point of the signal of the third alignment processing length is the absolute value of the inter-channel time difference of the current frame.

Optionally, the start point of the signal of the third processing length is located at a start point of the first-channel signal of the current frame or after the start point of the first-channel signal of the current frame, and a length between the start point of the signal of the third processing length and an end point of the first-channel signal of the current frame is greater than or equal to the difference between the third alignment processing length and the absolute value of the inter-channel time difference of the current frame.

Optionally, when performing delay recovery processing on the second-channel signal of the current frame based on the inter-channel time difference of the previous frame, the executable instruction is used to instruct the processor 1701 to perform the following steps of compressing a signal of a fourth processing length in the second-channel signal of the current frame into a signal of a fourth alignment processing length, to obtain the second-channel signal of the current frame after delay recovery processing, where the fourth processing length is determined based on the inter-channel time difference of the previous frame and the fourth alignment processing length, and the fourth processing length is greater than the fourth alignment processing length.

Optionally, the fourth processing length is a sum of an absolute value of the inter-channel time difference of the previous frame and the fourth alignment processing length.

Optionally, a start point of the signal of the fourth processing length is located before a start point of the signal of the fourth alignment processing length, and a length between the start point of the signal of the fourth processing length and the start point of the signal of the fourth alignment processing length is the absolute value of the inter-channel time difference of the previous frame.

Optionally, the start point of the signal of the fourth alignment processing length is located at a start point of the second-channel signal of the current frame or after the start point of the second-channel signal of the current frame, and a length between the start point of the signal of the fourth alignment processing length and an end point of the second-channel signal of the current frame is greater than or equal to the fourth alignment processing length.

Optionally, a length between the start point of the signal of the fourth alignment processing length and the start point of the second-channel signal of the current frame is equal to a fourth preset length, and a length between the start point of the signal of the third alignment processing length and the start point of the first-channel signal of the current frame is equal to a sum of the fourth preset length and the fourth alignment processing length.

An embodiment of this application further provides a computer readable storage medium configured to store a computer software instruction that needs to be executed by the foregoing processor. The computer software instruction includes a program that needs to be executed by the foregoing processor.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

A person skilled in the art can make various modifications and variations to this application without departing from the scope of this application. This application is intended to cover these modifications and variations provided that they fall within the scope of protection defined by the following claims.

What is claimed is:

1. A method comprising:

obtaining a pulse-code modulation (PCM) audio signal;

obtaining a first inter-channel time difference (ITD) of a current frame based on the PCM audio signal, wherein the first ITD is a time difference between a first-channel signal of the current frame and a second-channel signal of the current frame, and wherein a first sign of the first ITD is either a positive sign or a negative sign;

performing, when the first sign is different from a second sign of a second ITD of a previous frame adjacent to the current frame, a first delay alignment processing on the first-channel signal based on the first ITD to obtain a third signal;

performing, when the first sign is different from the second sign, a second delay alignment processing on the second-channel signal based on the second ITD to obtain a fourth signal;

performing a mid/side (M/S) downmix processing on the third signal and the fourth signal to obtain a fifth signal and a sixth signal; and encoding the fifth signal and the sixth signal.

2. The method of claim 1, wherein performing the first delay alignment processing on the first-channel signal comprises compressing a first processing length signal in the first-channel signal into a first alignment processing length signal in order to obtain the third signal.

3. The method of claim 2, further comprising obtaining a first processing length based on the first ITD and a first alignment processing length, wherein the first processing length is greater than the first alignment processing length.

4. The method of claim 3, wherein the first processing length is a first sum of an absolute value of the first ITD and the first alignment processing length.

5. The method of claim 4, wherein a first start point of the first processing length signal is located before a second start point of the first alignment processing length signal, and a first length between the first start point and the second start point is the absolute value of the first ITD, or wherein the second start point is located at a third start point of the first-channel signal or after the third start point, and a second length between the second start point and an end point of the first-channel signal is greater than or equal to the first alignment processing length, or wherein the second start point is located before the third start point, a third length between the second start point and the third start point is less than or equal to a transition section length, the second length is greater than or equal to a second sum of the first alignment processing length and the transition section length, and the transition section length is less than or equal to the absolute value of the first ITD.

6. The method of claim 1, wherein performing the second delay alignment processing on the second-channel signal comprises stretching a second processing length signal of a second processing length in the second-channel signal into a second alignment processing length signal of a second alignment processing length in order to obtain the fourth signal.

7. The method of claim 6, further comprising obtaining the second processing length based on the second ITD and the second alignment processing length, wherein the second processing length is less than the second alignment processing length.

8. The method of claim 7, wherein the second processing length is a difference between the second alignment processing length and an absolute value of the second ITD.

9. The method of claim 8, wherein a first start point of the second processing length signal is located after a second start point of the second alignment processing length signal, and a first length between the first start point and the second start point is the absolute value of the second ITD, or wherein the second start point is located at a third start point of the second-channel signal or after the third start point, and a second length between the second start point and an end point of the second-channel signal is greater than or equal to the second alignment processing length.

10. An apparatus comprising:

one or more memories configured to store programming instructions; and one or more processors coupled to the one or more memories and configured to execute the programming instructions to cause the apparatus to:

obtain a pulse code modulation (PCM) audio signal;

obtain a first inter-channel time difference (ITD) of a current frame based on the PCM audio signal, wherein the first ITD is a time difference between a first-channel signal of the current frame and a second-channel signal of the current frame, and wherein a first sign of the first ITD is either a positive sign or a negative sign;

perform, when the first sign is different from a second sign of a second ITD of a previous frame adjacent to the current frame, a first delay alignment processing on the first-channel signal based on the first ITD to obtain a third signal;

perform, when the first sign is different from the second sign, a second delay alignment processing on the second-channel signal based on the second ITD to obtain a fourth signal;

perform a mid/side (M/S) downmix processing on the third signal and the fourth signal to obtain a fifth signal and a sixth signal; and encode the fifth signal and the sixth signal.

11. The apparatus of claim 10, wherein the one or more processors are further configured to execute the programming instructions to cause the apparatus to perform the first delay alignment processing on the first-channel signal by compressing a first processing length signal in the first-channel signal into a first alignment processing length signal in order to obtain the third signal.

12. The apparatus of claim 11, wherein the one or more processors are further configured to execute the programming instructions to cause the apparatus to obtain a first processing length based on the first ITD and a first alignment processing length, and wherein the first processing length is greater than the first alignment processing length.

13. The apparatus of claim 12, wherein the first processing length is a first sum of an absolute value of the first ITD and the first alignment processing length.

14. The apparatus of claim 13, wherein a first start point of the first processing length signal is located before a second start point of the first alignment processing length signal, and a first length between the first start point and the second start point is the absolute value of the first ITD, or wherein the second start point is located at a third start point of the first-channel signal or after the third start point, and a second length between the second start point and an end point of the first-channel signal is greater than or equal to the first alignment processing length, or wherein the second start point is located before the third start point, a third length between the second start point and the third start point is less than or equal to a transition section length, the second length is greater than or equal to a second sum of the first alignment processing length and the transition section length, and the transition section length is less than or equal to the absolute value of the first ITD.

15. The apparatus of claim 10, wherein the one or more processors are further configured to execute the programming instructions to cause the apparatus to perform the second delay alignment processing on the second-channel signal by stretching a second processing length signal of a second processing length in the second-channel signal into a second alignment processing length signal of a second alignment processing length in order to obtain the fourth signal.

16. The apparatus of claim 15, wherein the one or more processors are further configured to execute the programming instructions to cause the apparatus to obtain the second processing length based on the second ITD and the second alignment processing length, wherein the second processing length is less than the second alignment processing length.

17. The apparatus of claim 16, wherein the second processing length is a difference between the second alignment processing length and an absolute value of the second ITD.

18. The apparatus of claim 17, wherein a first start point of the second processing length signal is located after a second start point of the second alignment processing length signal, and a first length between the first start point and the second start point is the absolute value of the second ITD, or wherein the second start point is located at a third start point of the second-channel signal or after the third start point, and a second length between the second start point and an end point of the second-channel signal is greater than or equal to the second alignment processing length.

19. A non-transitory computer-readable storage medium storing computer instructions, that when executed by one or more processors, cause the one or more processors to:

obtain a pulse code modulation (PCM) audio signal;

obtain a first inter-channel time difference (ITD) of a current frame based on the PCM audio signal, wherein the first ITD is a time difference between a first-channel signal of the current frame and a second-channel signal of the current frame, and wherein a first sign of the first ITD is either a positive sign or a negative sign;

perform, when the first sign is different from a second sign of a second ITD of a previous frame adjacent to the current frame, a first delay alignment processing on the first-channel signal based on the first ITD to obtain a third signal;

perform, when the first sign is different from the second sign, a second delay alignment processing on the second-channel signal based on the second ITD to obtain a fourth signal;

perform a mid/side (M/S) downmix processing on the third signal and the fourth signal to obtain a fifth signal and a sixth signal; and encode the fifth signal and the sixth signal.

20. The non-transitory computer-readable storage medium of claim 19, wherein the computer instructions, that when executed by the one or more processors, cause the one or more processors to perform the first delay alignment processing on the first-channel signal by compressing a first processing length signal in the first-channel signal into a first alignment processing length signal in order to obtain the third signal.

* * * * *